United States Patent
Ezra et al.

(10) Patent No.: US 6,714,195 B1
(45) Date of Patent: Mar. 30, 2004

(54) IMAGE PROCESSING APPARATUS

(75) Inventors: Rabin Ezra, Guildford (GB); Adam Michael Billyard, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/513,471

(22) Filed: Feb. 25, 2000

(30) Foreign Application Priority Data

Mar. 1, 1999 (GB) .............................................. 9904679
Nov. 11, 1999 (GB) .............................................. 9926757

(51) Int. Cl.$^7$ .............................................. G06T 17/20
(52) U.S. Cl. ........................ 345/423; 345/581; 345/582
(58) Field of Search ................................ 345/419, 420, 345/582, 584, 585, 588, 619, 620, 629, 581, 421, 621, 423; 382/181

(56) References Cited

U.S. PATENT DOCUMENTS

| | | | |
|---|---|---|---|
| 5,253,339 A | 10/1993 | Wells et al. ................. | 395/126 |
| 5,563,989 A | 10/1996 | Billyard ....................... | 395/126 |
| 5,579,454 A | 11/1996 | Billyard et al. .............. | 395/121 |
| 5,602,979 A | 2/1997 | Loop ............................ | 395/123 |
| 5,666,472 A | 9/1997 | Huddy ........................ | 345/119 |
| 5,757,321 A | 5/1998 | Billyard ....................... | 345/434 |
| 5,777,620 A | 7/1998 | Billyard ....................... | 345/426 |
| 6,128,019 A | * 10/2000 | Crocker et al. | |
| 6,208,347 B1 | * 3/2001 | Migdal et al. .............. | 345/419 |
| 6,246,414 B1 | 6/2001 | Kawasaki ................... | 345/419 |
| 6,356,280 B1 | * 3/2002 | Kamen et al. | |
| 6,456,287 B1 | * 9/2002 | Kamen et al. .............. | 345/427 |

FOREIGN PATENT DOCUMENTS

| | | |
|---|---|---|
| EP | 0 366 463 | 5/1990 |
| EP | 0 590 995 | 4/1994 |
| EP | 0 596 667 | 5/1994 |
| EP | 0 806 744 | 11/1997 |
| EP | 0 996 094 | 4/2000 |
| JP | 03-271877 | 3/1991 |
| WO | WO 99/53445 | 10/1999 |

OTHER PUBLICATIONS

Rabinovich et al ("Visualization of Large Terrains in Resource–Limited Computing Environments": 0–8186–8262–0/97 1997 IEEE.*

Miyata ("A Method of Generating Cloud Images Using Density Contour Lines": The Transactions of the IEICE, vol.E.72, No. 6 Jun. 1989).*

R. Cook, "Shade Trees", Computer Graphics, vol. 18, No. 3, Jul. 1984, pp. 223–231.

J. Foley et al., "Illumination and Shading", Computer Graphics, Second Edition, Principles and Practice, pp. 806–812.

A.A.M. Kuijk et al., "Faster Phong Shading Via Angular Interpolation", Computer Graphics Forum, No. 8, pp. 315–324, (1989).

(List continued on next page.)

*Primary Examiner*—Mano Padmanabhan
(74) *Attorney, Agent, or Firm*—Fitzpatrick, Cella, Harper & Scinto

(57) ABSTRACT

Computer graphics apparatus is configured to represent an object with surface relief detail in terms of its underlying shape over which is superimposed a mapped geometry to represent the relief feature. Superimposition can be made dependent on a level-of-detail threshold, and masking geometry may also be superimposed to properly mask a texture map otherwise lacking in resolution.

34 Claims, 35 Drawing Sheets

OTHER PUBLICATIONS

M. Shantz et al., "Shading Bicubic Patches", Computer Graphics, vol. 21, No. 4, pp. 189–196, (Jul. 1987).

C. Bajaj et al., "Smoothing Polyhedra Using Implicit Algebraic Splines", Computer Graphics, vol. 26, No. 2, pp. 79–88, (Jul. 1992).

G. Farin, "Triangular Bernstein–Bézier pa", Computer Aided Geometric Design, No. 3, pp. 83–127, (1986).

M.J. Castro Diaz, "Mesh Refinement Over Triangulated Surfaces", Inria Research Report, pp. 1–40, (Oct. 1994).

Xia, Julie C. et al., "Adaptive Real–Time Level–of–Detail–Based Rendering for Polygonal Models", IEEE Transactions on Visualization and Computer Graphics, IEEE Service Center, vol. 3, No. 2, pp. 171–183, (Apr. 1, 1997).

J. Foley et al., Computer Graphics Principles and Practice, Second Edition, pp. 664–680.

Barequet, Gill et al., "RSVP: A Geometric Toolkit for Controlled Repair of Solid Models", IEEE Transactions on Visualization and Computer Graphics, IEEE Service Center, vol. 4, No. 2, pp. 162–177, (Apr. 1, 1998).

A.V. Gelder et al., "Direct Volume Rendering with Shading Via Three–Dimensional Textures", Proceedings of the 1996 Symposium on Volume Visualization, pp. 23–30, (Oct. 1996).

Pharr et al., "Geometry Caching for Ray–Tracing Displacement Maps", Proceedings of the Seventh Eurographics Workshop on Rendering, pp. 31–40 and 280–294, (Jun. 1996).

Becker et al., "Smooth Transitions Between Bump Rendering Algorithms", Computer Graphics Proceedings, Annual Conference Series, pp. 183–189, (1993).

Cook et al., "The Reyes Image Rendering Architecture", Computer Graphics, vol. 21, No. 4, pp. 95–102, (Jul. 1987).

J.D. Foley et al., Computer Graphics Principles and Practice, Second Edition, pp. 511–528 and 721–741, (1993).

D.E. Breen, "Creation and Smooth–Shading of Steiner Patch Tessellations", Proceedings Fall Joint Computer Conference, pp. 931–940 (1986).

D.F. Rogers, Procedural Elements for Computer Graphics, McGraw–Hill, pp. 317–319, (1988).

J. Arvo, "Stratified Sampling of Spherical Triangles", Computer Graphics Proceedings, Annual Conference Series, pp. 437 & 438, (1995).

J.D. Foley et al., Computer Graphics Principles and Practice, Second Edition, pp. 488–490 and 514 (1993).

* cited by examiner $V_i$ | $u_i$ | $v_i$ | $D_i$ | $l_i$ | FLAGS$_i$ |

$t_j$ | $V_a$ | $V_b$ | $V_c$ | $t_a$ | $t_b$ | $t_c$ | FLAGS$_j$ |

| | | | | | | | |
|---|---|---|---|---|---|---|---|
| $t_1$ | $V_1$ | $V_5$ | $V_6$ | $t_6$ | $t_3$ | $t_2$ | FLAGS |
| $t_2$ | $V_1$ | $V_6$ | $V_2$ | $t_1$ | $t_4$ | 0 | FLAGS |
| $t_3$ | $V_3$ | $V_6$ | $V_5$ | $t_4$ | $t_1$ | $t_5$ | FLAGS |
| $t_4$ | $V_2$ | $V_6$ | $V_3$ | $t_2$ | $t_3$ | 0 | FLAGS |
| $t_5$ | $V_3$ | $V_5$ | $V_4$ | $t_3$ | $t_6$ | 0 | FLAGS |
| $t_6$ | $V_1$ | $V_4$ | $V_5$ | 0 | $t_5$ | $t_1$ | FLAGS |

FIG. 9

| BINS | | 0 | 1 | 2 | 3 | 4 |
|---|---|---|---|---|---|---|
| | 0 | $t_1, t_2, t_6$ | $t_1, t_2$ | $t_2$ | $t_2$ | $t_2, t_4$ |
| | 1 | $t_1, t_6$ | $t_1, t_2$ | $t_1, t_2$ | $t_1, t_2, t_3, t_4$ | $t_2, t_4$ |
| | 2 | $t_1, t_6$ | $t_1, t_3, t_6$ | $t_1, t_3$ | $t_1, t_3, t_4$ | $t_3, t_4$ |
| | 3 | $t_5, t_6$ | $t_1, t_3, t_5, t_6$ | $t_3, t_5$ | $t_3, t_5$ | $t_3, t_4$ |
| | 4 | $t_5, t_6$ | $t_5$ | $t_5$ | $t_3, t_5$ | $t_3, t_4, t_5$ |

FIG. 10

IMAGE PROCESSING APPARATUS

The present invention is concerned with image processing apparatus, and is particularly concerned with the processing of images consisting of scenes involving objects in three dimensions (3D).

In the field of computer graphics, an object surface is commonly represented by means of a series of polygons, most usually triangles. Those triangles can be described in terms of the coordinates of their vertices in 3D space, which can be stored as 3D object data in a memory. The representation of an object surface is computationally inexpensive in the event that the object surface is generally free of detailed relief. In that case, the object surface can be represented by relatively large triangles, which results in relatively little object data being created to describe the triangles. In that way, relatively little memory is required in the computer in order to describe the object surface.

However, if a surface has quite detailed surface relief features, then a large number of very small triangles may be required in order to describe that surface. In that case, the description of the surface can result in the creation of a large amount of object data, the conversion of which into image data can be computationally expensive.

Therefore, in the past, it has been found convenient to describe an object surface in two stages which are briefly described below.

Firstly, the general outline of the object surface is described, using the method described above involving a mesh of triangles. It will be understood that alternative methods of describing an object surface are available, such as by using control points to define a bezier (or other spline) surface, or by providing a mathematical equation of which the surface is a locus.

Secondly, a texture bit map is overlaid over the triangles forming the general outline of the object surface. That texture bit map includes detail which gives the viewer the impression that a relief feature is present, but where the feature is actually described by areas of contrasting colour and shading. The texture bit map may itself be defined over a unit square in a two dimensional space with coordinates (u,v). In the case that a texture bit map is not defined over a unit square, it is possible to map the definition space to that of a unit square. Vertices in the 3D space are given (u,v) coordinates, and the bit map can be clipped to triangles in the mesh by interpolation between the vertices, and finding correspondences between points in the triangles and points in the bit map.

For example, an object consisting of a graphical representation of a metalled road can be described in terms of a series of relatively large triangles, in view of the fact that the object has a generally flat overall surface. However, in order to represent the roughness of the road, or potholes in the road, using triangles, a large number of relatively small triangles would be required. Therefore, it is convenient to illustrate a feature such as a pothole or surface roughness in terms of its appearance, without being concerned with its shape. Accordingly, a texture bit map can be overlaid over the general outline surface of the road (defined by a mesh of large triangles), the texture bit map including a region shaded a darker colour than the rest of the road to represent the appearance of the pothole. The texture bit map could include a "mottled" pattern in order to represent the appearance of surface roughness.

That depiction of relief features of an object is reasonably effective when the viewpoint of the object is some distance away from the object. However, it becomes apparent to the viewer how the relief feature has been simulated once the viewpoint becomes much closer to the object. This can lead to deterioration in the overall impression of the quality of the image, and is therefore undesirable.

"Shade Trees" by Robert L Cook (Computer Graphics Volume 18 Number 3, July 1984, pp 223–231) proposes the use of displacement maps to simulate texture more effectively than texture maps. Displacement maps modify positions of points in the final shading process, whichever process is employed.

A first aspect of the invention provides apparatus and a method which augments a texture bit map with further geometry which allows an object to which the texture bit map is applied to include real 3D geometry corresponding to the texture apparently modelled by the texture bit map.

This contrasts with the method described in the paper by Cook, which merely modifies point positions on a piecemeal basis. The present invention is advantageous because it incorporates the further geometry into the data structure defining the object to be illustrated.

A second aspect of the invention provides computer graphic apparatus comprising means for storing information defining a three dimensional object to be displayed, means for storing information defining a texture to be applied to the object, and means for storing information defining additional three dimensional geometry to be superimposed over the texture in use.

A third aspect of the invention provides means for graphically representing a three dimensional object, including first storage means for storing information defining the underlying shape of said object, and second storage means for storing information defining detailed shape of said object, and means for imposing said information in said second storage means over said information in said first storage means.

In that third aspect, the imposition means may be operative to impose provided that said underlying shape is closer to a nominal viewer than a predetermined threshold.

Preferably, the further geometry includes means for indicating whether or not an individual element of that geometry is to be displayed. In that way, finer control of edges of underlying geometry can be achieved, potentially reducing aliasing.

Preferred and specific embodiments of the invention will now be described with reference to the accompanying drawings, in which:

FIG. 9 shows a list of triangle objects as set out in FIG. 7, associated with the first geometric texture illustrated in FIG. 8;

FIG. 10 is a schematic diagram showing the contents of bins of the data structure associated with the first geometric texture illustrated in FIG. 8;

FIG. 1 is a block diagram showing the general arrangement of an image processing apparatus according to a specific embodiment of the invention. In the apparatus, a computer 20 comprises a central processing unit (CPU) 22 connected to a memory 24 operable to store a program defining the sequence of operations of the CPU 22, and to store object and image data used in calculations by the CPU 22.

Figure 1:
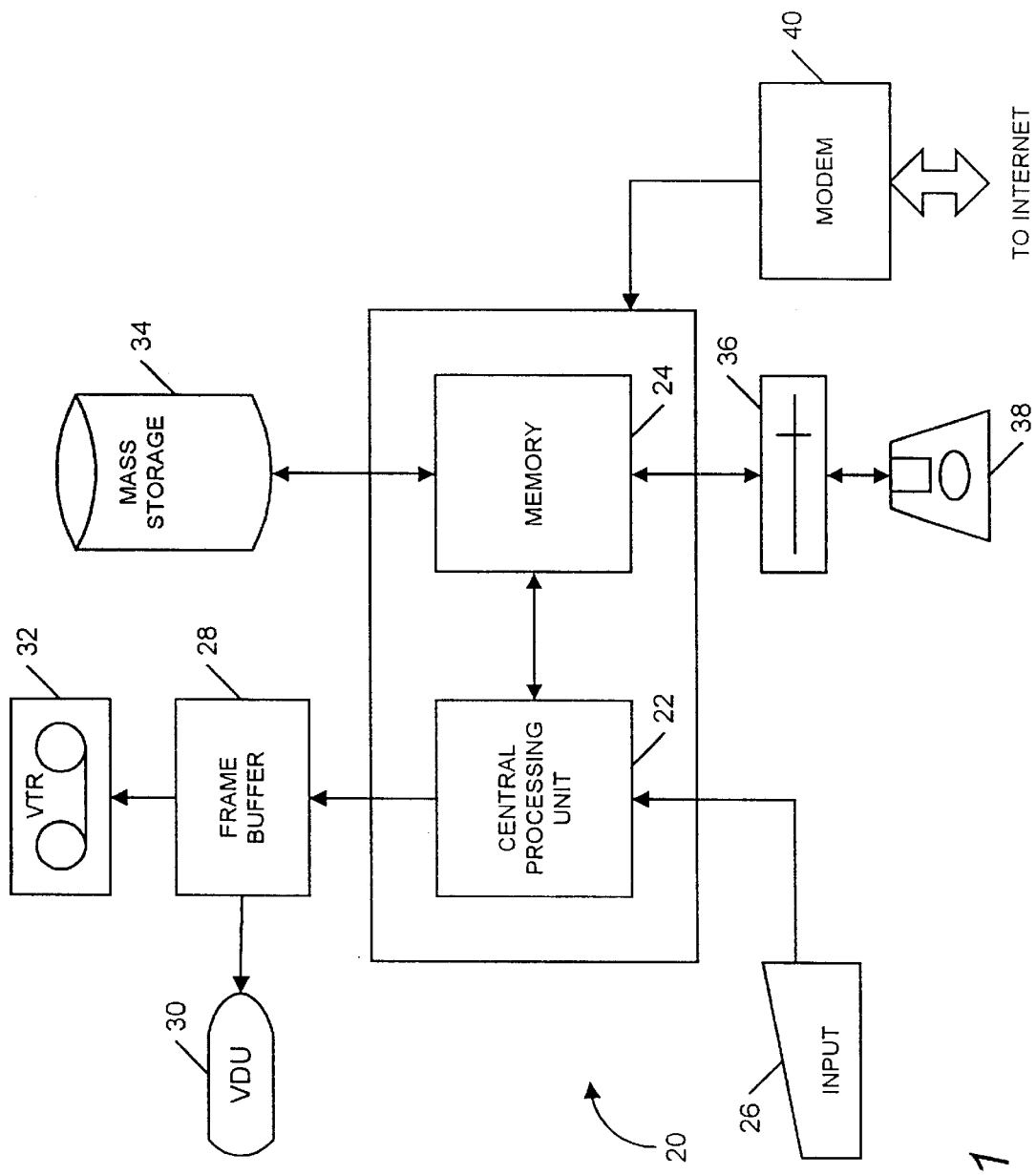
FIG. 1 is a schematic diagram showing the components of a computer operable in accordance with a first specific embodiment of the invention.

An input device 26 is coupled to an input port (not shown) of the CPU 22. The input device 26 may comprise, for example, a keyboard and/or a position sensitive input device such as a mouse, trackerball, or a digitizer tablet and stylus etc.

A frame buffer 28 is also coupled to the CPU 22, the frame buffer 28 comprising a memory unit (not shown) arranged to store image data relating to at least one image, for example by providing one (or several) memory location (s) per pixel of the image. The value(s) stored in the frame buffer 28 for each pixel defines the colour or intensity of that pixel in the image.

In the present embodiment of the invention, an image is represented as a two-dimensional array of pixels, which can conveniently be described in terms of Cartesian coordinates. The position of a given pixel can be described by a pair of x,y coordinates. The frame buffer 28 has sufficient memory capacity to store at least one image. If the image has a resolution of 1000×1000 pixels, the frame buffer 28 should include $10^6$ pixel locations, each location being addressable directly or indirectly in terms of pixel coordinates x,y.

A video display unit (VDU) 30 is coupled to the frame buffer 28. The VDU 30 is operative to display the image stored in the frame buffer 28 in a conventional manner. For instance, if the VDU 30 displays images in a raster scanning manner, the x coordinate of a pixel maps to the distance along a line of the scanned display, and the y coordinate of the pixel maps to the number of the line.

Also coupled to the frame buffer 28 is a video tape recorder (VTR) 32. Another image recording device, such as a paper printer or 35 mm film recorder could be provided in addition or in the alternative. The VTR 32 is operable to receive data from the frame buffer and to store data as magnetic signals on a magnetic tape.

A mass storage device 34, such as a hard disk drive, is coupled to the memory 24. The mass storage device 34 has a high data storage capacity, suitable for storing data to which instant access is not required. The mass storage device 34 also stores control signals defining a sequence of processor implementable instructions comprising a computer program under the control of which the computer 20 is put.

Moreover, a disk drive 36, operable to accept removable data storage media such as a floppy disk 38, is coupled to the memory 24. The disk drive 36 is operable to transfer data stored on the floppy disk 38 to the memory 24. That data can subsequently be stored on the mass storage device 34. Data can also be introduced by means of a compact disk installed in a compact disk player (not shown). Further, a modem 40 connects the computer 20 to the Internet for the transfer of information to and from remote computer devices.

Figure 2:
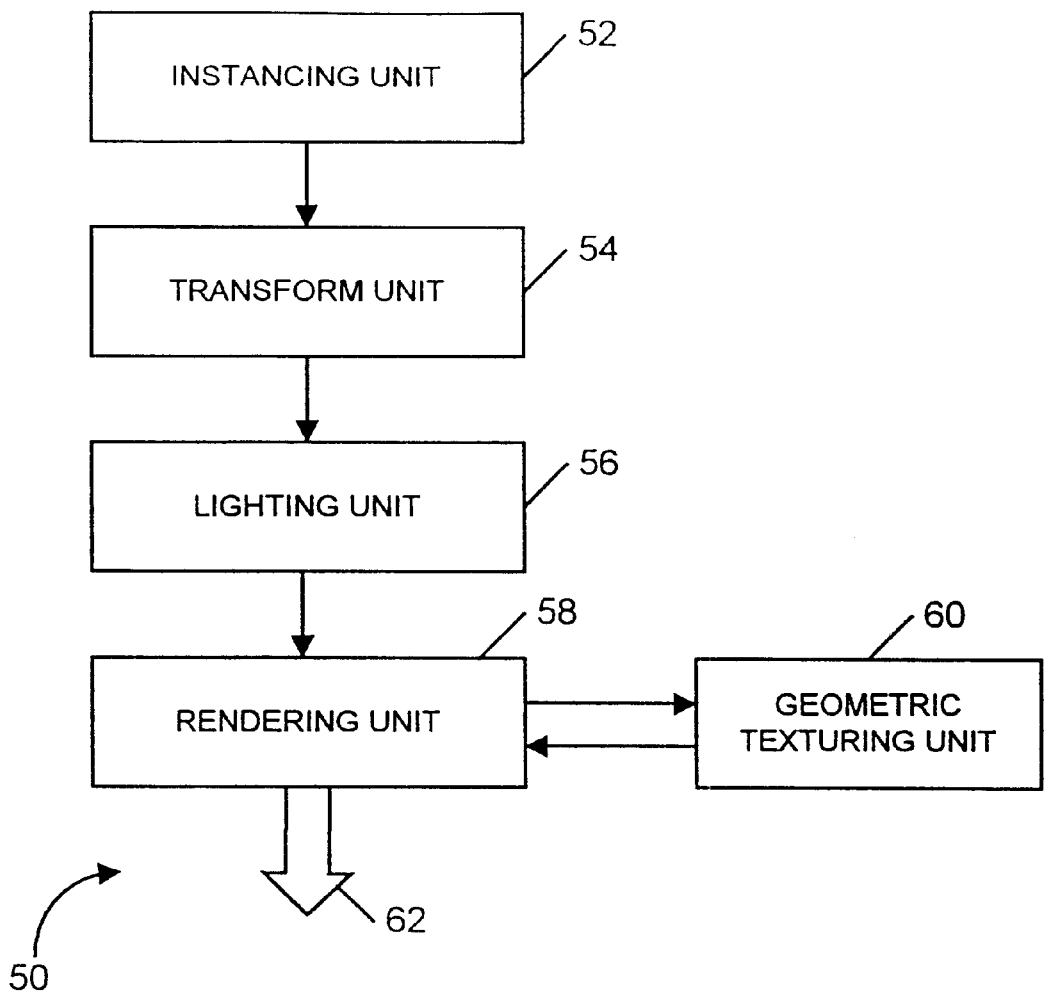
FIG. 2 is a schematic diagram showing the components of a rendering pipeline in accordance with the embodiment illustrated in FIG. 1.

FIG. 2 illustrates a rendering pipeline 50 including a geometric texturing facility in accordance with a specific embodiment of the present invention. However, it will be appreciated that other rendering pipelines may also be appropriate. Rendering pipelines are discussed in "Computer Graphics" by Foley, Van Dam, Feiner and Hughes (2nd ed., Addison Wesley, ISBN 0-201-12110-7), hereinafter referred to as "Foley, van Dam, Feiner, Hughes", pages 806 to 812.

The rendering pipeline 50 is implemented in the computer 20, through the storage of computer implementable instructions in the memory 24 or accessible from the mass storage device 34.

The rendering pipeline 50 consists of a number of processing units, operable on object primitives in order to provide image data relating thereto. Primitives can be triangles, triangle strips, triangle fans, lines or polylines. The present invention is applicable to polygon primitives, and is specifically described in relation to triangles.

The rendering pipeline 50 includes an instancing unit 52. In use, a graphics modelling application making use of, or "including", the rendering pipeline, will store objects in many different formats. When an object is selected for display, the instancing unit 52 operates on the object to convert it into a format common to the remainder of the rendering pipeline 50. If the application including the rendering pipeline passes objects to the pipeline in the form of single 3D primitives, the instancing unit 52 will be trivial.

The instancing unit 52 outputs a series of collections of primitives, with associated material data, described in terms of world and/or local object spaces. The rendering pipeline 50 further includes a transform unit 54, which receives those series of collections of primitives from the instancing unit 52. The transform unit 54 collapses all of the information associated with a particular set of primitives, and the viewing transform, into a single transform, which is then applied to the data. Any primitives which, due to overlap or partial obscuring, require clipping are flagged by the transform unit 54. However, clipping is not performed by the transform unit 54 itself.

If the primitives are in a pretransformed state when they are supplied to the pipeline 50 by a graphics modelling application, the transform unit 54 may be trivial, or null.

The rendering pipeline 50 further includes a lighting unit 56. The lighting unit 56 receives transformed primitives from the transform unit 54. The lighting unit 56 combines data relating to global lighting with material data and orientation data of the primitives to compute colour values which will be interpolated during rasterisation.

Lighting is generally object specific, since it refers back to the original object for material information. Not all collections of primitives will be lit by the lighting unit 56, because some may be supplied with precomputed lighting values by the graphics modelling application.

The rendering pipeline 50 further includes a rendering unit 58 which acts on lit collections of primitives sent by the lighting unit 56. For reasons of efficiency, primitives are sent down the pipeline in groups, or collections. However, in order to render the primitives, they must be "unpacked" by the rendering unit 58 and dealt with individually.

The rendering unit 58 has associated therewith a geometric texturing unit 60. The geometric texturing unit 60 receives an individual primitive unpacked by the rendering unit 58, and checks whether a geometric texture is to be superimposed thereon. If a geometric texture is to be superimposed, the geometric texturing unit 60 sends back a series of triangles produced by superimposing the geometric texture over the primitive. Otherwise, the primitive is returned to the rendering unit.

Figure 3:
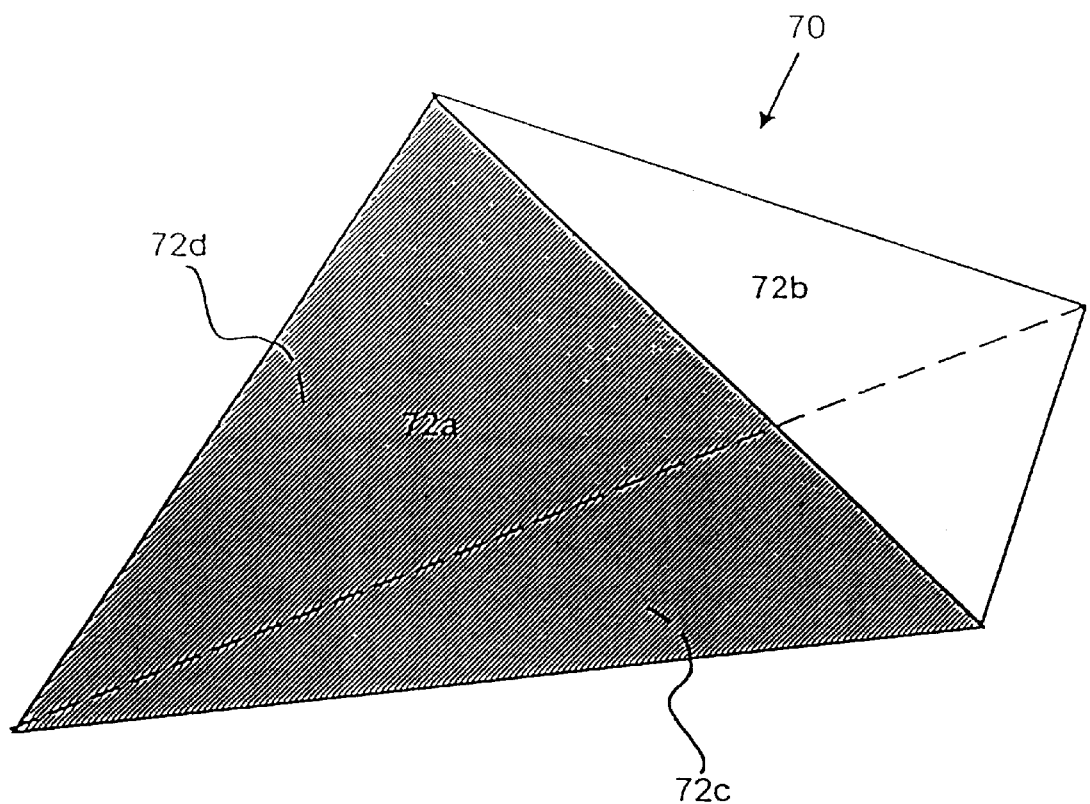
FIG. 3 is a perspective view of an object to-which a geometric texture in accordance with the embodiment illustrated in FIG. 1 is to be applied.
Figure 4:
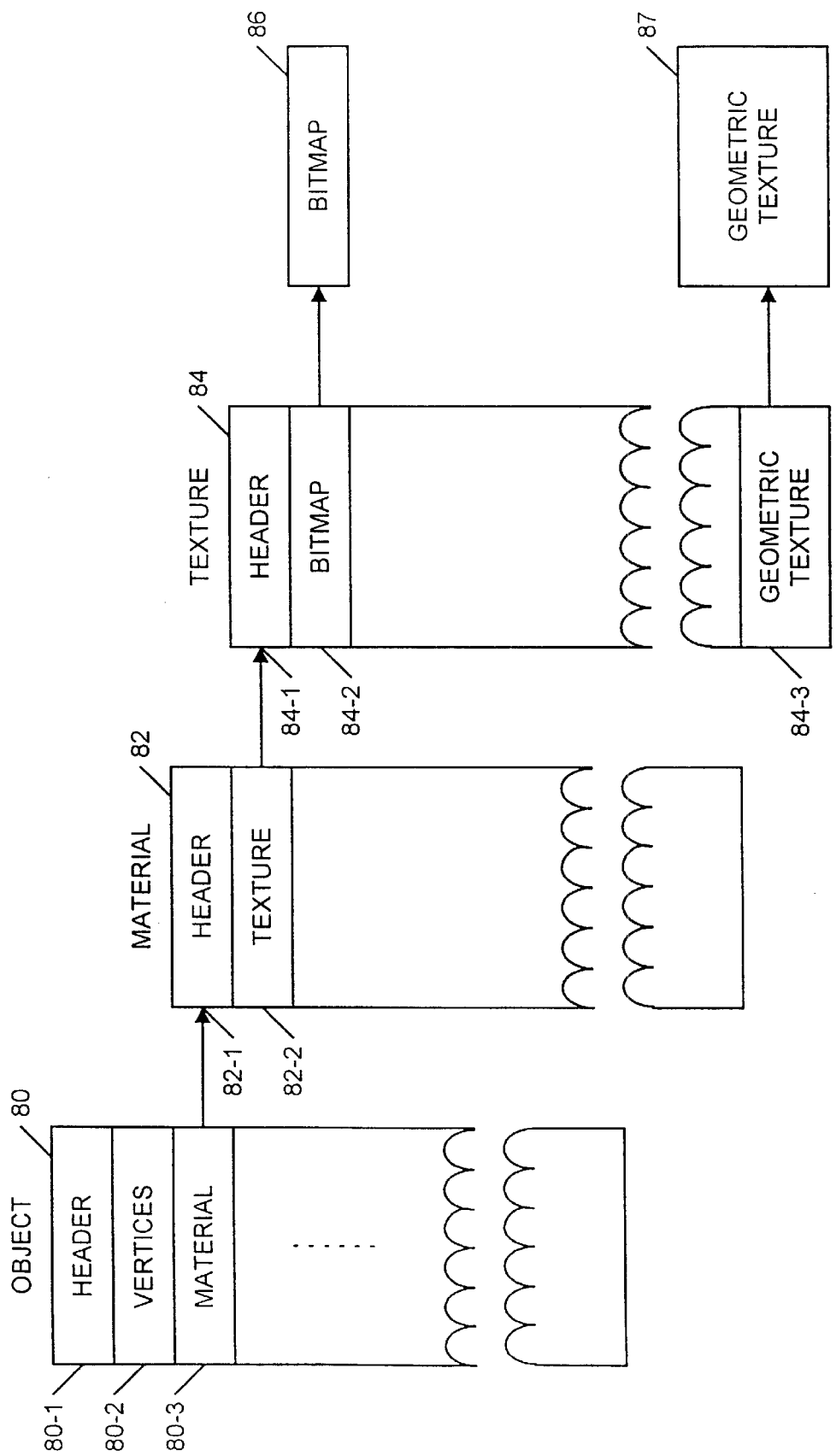
FIG. 4 is a schematic diagram showing a data structure defining the object illustrated in FIG. 3, incorporating a data structure for a geometric texture.

The primitives, whether converted by the geometric texturing unit 60 or not, are dispatched by the rendering unit to be rendered for rasterisation. The final output of the rendering unit is a stream of rasterised data 62 for the production of an image on the VDU 30. FIG. 3 illustrates a body 70 of pyramidal shape, defined by four triangles 72a, b, c, d. Each of those triangles 72a, b, c, d has associated therewith an object data structure 80 as illustrated in FIG. 4. The object data structure 80 includes a header 80-1, and a series of fields 80-2, 80-3 defining the characteristics of the object, such as the position of the vertices and the material of the object. The field 80-3 specifying the material points to another data structure named a material object 82.

The material object 82 includes a header 82-1, and fields 82-2 containing information defining the characteristics of the material, such as the texture of the material. The field 82-2 specifying the texture points to another data structure named a texture object 84.

The texture object 84 includes a header 84-1, and fields 84-2, 84-3 containing information defining the characteristics of the texture. One of those fields 84-2 is a bit map field, which points to a bit map 86.

As is known from the above referenced book by Foley, van Dam, Feiner and Hughes, page 741–745, the process of rendering a triangle having a texture mapping associated therewith relies upon a mapping of points in the texture bit map with points on the triangle. That is achieved by defining the texture bit map in two-dimensional space in terms of u,v coordinates, and the vertices specified for the triangle 72a, b, c, d are defined, not just in terms of their physical position in x,y space, but also in terms of their correspondence with u,v space. Therefore, a point in the bit map can be mapped to a triangle by reference to the u,v coordinates of the vertices of the triangle 72a, b, c, d. The bit map is defined over a unit square in u,v space, but the triangle 72a, b, c, d may be defined in u,v space over an area not coincident with that unit square region. To fit the texture bit map to the object triangle, the bit map may need to be repeated and/or clipped.

The texture object 84 is augmented by a further field, specifying a geometric texture. The geometric texture field contains a pointer which points to a geometric texture object 87.

The texture object 84 is augmented by the geometric texture object 87 by means of an extension of the texture object type. The texture object type has associated therewith a doubly linked list of extensions thereto, each extension consisting of data defining the allocation of memory for that extension. Therefore, when a texture object including a geometric texture is defined, the computer is instructed not only to allocate memory for the texture object itself, and the expected texture bit map, but also to allocate memory for a geometric texture object type which would have been defined elsewhere. As is to be described hereafter, the geometric texture object type will most likely contain a series of linked lists or pointers.

Figure 5:
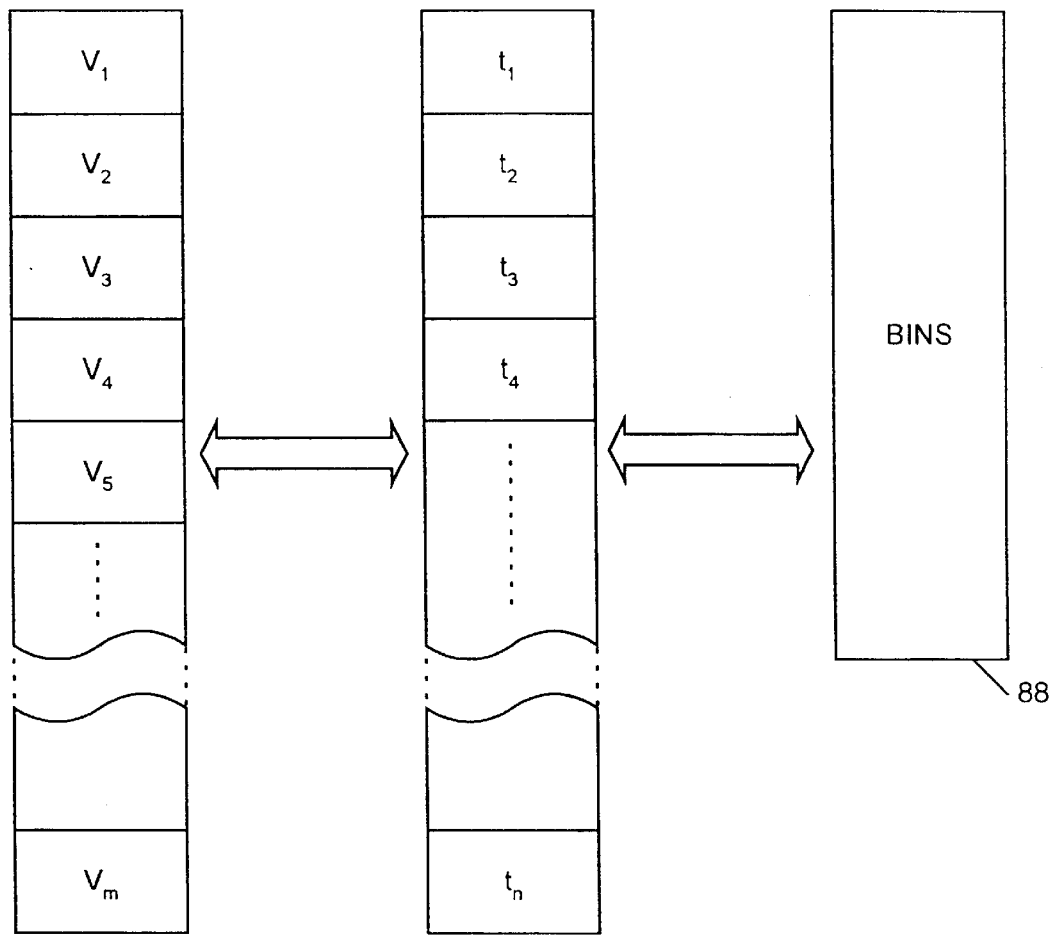
FIG. 5 is a schematic diagram of the data structure of the geometric texture illustrated in FIG. 4.

The geometric texture object 87 is described in more detail with reference to FIG. 5. The geometric texture object 87 includes a list of vertices $V_1$ to $V_m$, defining the position of points within the geometric texture, a list of triangles $t_1$ to $t_n$ defined by the vertices $V_1$ to $V_m$, and a two-dimensional array of bins 88. The bins 88 constitute an array of lists of triangles, selected from the list of all triangles ($t_1, \ldots t_n$). The array of bins 88 corresponds to an array of regions covering the geometric texture in u,v space. Each bin 88 comprises a list $B_{pq}$ of triangles from the list of triangles ($t_1, \ldots t_n$) which are at least partially contained in the region corresponding with the bin.

Figures 6, 7, 8:
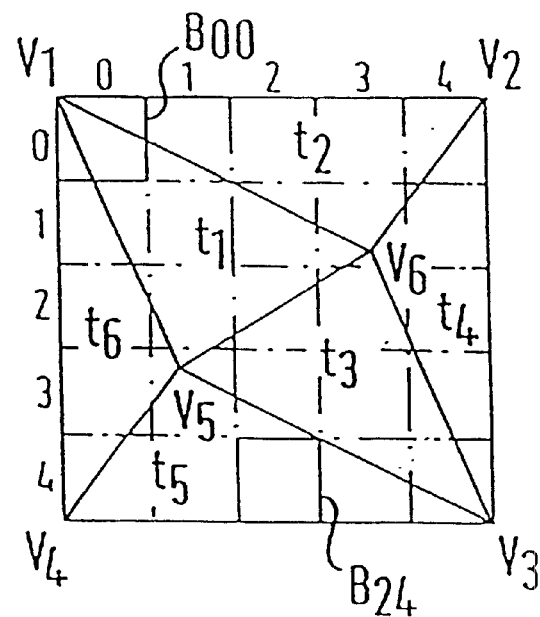
FIG. 6 is a schematic diagram showing a data structure of a vertex object within the data structure illustrated in FIG. 5.
FIG. 7 is a schematic diagram showing a data structure of a triangle object within the data structure illustrated in FIG. 5.
FIG. 8 is a plan view of a first geometric texture in accordance with the first specific embodiment of the invention.

FIG. 6 illustrates the data structure associated with each vertex $V_i$. Each vertex $V_i$ is defined in terms of its coordinates $u_i, v_i$ in u,v space, and a displacement $D_i$ out of the u,v plane. An index field $I_i$ and a FLAGS$_i$ field are also provided, for use in procedures to be described later.

FIG. 7 illustrates the data structure associated with each triangle $t_j$. Three fields are provided to specify vertices $V_a$, $V_b$ and $V_c$, which define the triangle $t_j$. Three fields $t_a$, $t_b$ and $t_c$ are provided to specify the three triangles adjacent to the triangle $t_j$. A FLAGS$_j$ field is provided for use in procedures to be described later.

FIG. 8 shows a simple geometric texture to illustrate the use of the previously described data structure to define a geometric texture therein. This, first, geometric texture is not dealt with later on when demonstrating the method according to the specific embodiment, but is considered at this stage because its relative lack of complexity allows the use of the data structure to be demonstrated clearly. The geometric texture is generally square, having four corner vertices $V_1$, $V_2$, $V_3$, $V_4$ and two internal vertices $V_5$ and $V_6$. Edges are defined between those six vertices, so as to define six triangles $t_1$ to $t_6$.

The vertices $V_1$ to $V_6$ are entered on the list of vertices contained in the geometric texture object 87. It is preferable to place the four corner vertices $V_1$ to $V_4$ at the top of the list, since this makes it easier to locate the corners during procedures to be described later. Internal vertices $V_5$ and $V_6$ are entered onto the list below the corner vertices. The order of entry of the internal vertices onto the list is not significant.

FIG. 9 illustrates entry of the triangles of the geometric texture object 87 into the data structure for triangles $t_1$ to $t_n$ as described with reference to FIG. 6. For example, triangle $t_1$ is defined by vertices $V_1$, $V_5$ and $V_6$ and has adjacent thereto triangles $t_6$, $t_3$ and $t_2$. A FLAGS field is provided as described earlier. As shown in relation to triangle $t_2$, when a triangle is adjacent an edge of the geometric texture, one of the "adjacent triangle" fields $t_a$, $t_b$, $t_c$ will be entered with a null value, because no triangle exists adjacent that edge of the triangle. In this example, the adjacent triangles have been entered into the fields, such that field $t_a$ contains the triangle adjacent the edge defined by the vertices contained in fields $V_a$ and $V_b$, field $t_b$ contains the triangle adjacent the edge defined by the vertices contained in the fields $V_b$ and $V_c$, and field $t_c$ contains the triangle adjacent the edge defined by the vertices contained in fields $V_c$ and $V_a$.

Superimposed over the geometric texture is a 5×5 grid of bins 88. The bins 88 are bounded by broken lines as illustrated in FIG. 8. FIG. 9 illustrates the data structure associated with the bins 88. Each bin includes a list of triangles at least partially contained within that bin. Each bin 88 is described herein by notation $B_{ij}$, wherein i increases from left to right in FIG. 8 and j increases from top to bottom.

For example, bin $B_{00}$ corresponds with a region denoted by that reference in FIG. 8 and bounded by a solid line, and which includes portions of triangles $t_1$, $t_2$ and $t_6$. Therefore, bin $B_{00}$ lists triangles $t_1$, $t_2$ and $t_6$. The region corresponding with bin $B_{24}$, denoted by that reference in FIG. 8 and bounded by said line, is fully contained within triangle $t_5$, and so bin $B_{24}$ only lists $t_5$ therein.

Figure 11:
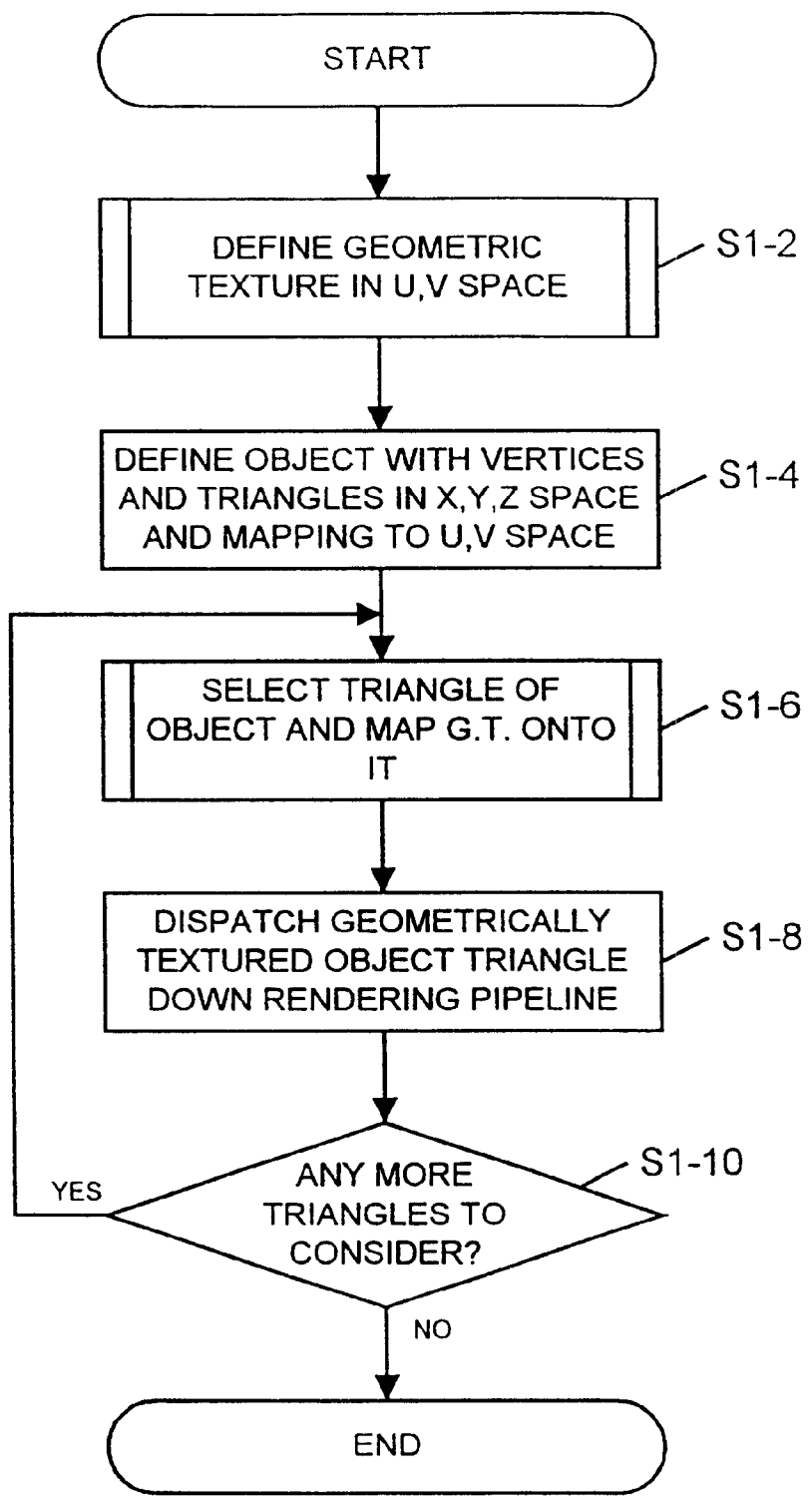
FIG. 11 is a flow diagram illustrating steps included in the process of incorporating a geometric texture into a given object.

With reference to FIG. 11, a procedure will now be described which enables a geometric texture, as defined in data structure as illustrated in FIGS. 4 to 10, to be applied to an otherwise planar triangle 72a of the body 70 illustrated in FIG. 3.

In a first step S1-2, the procedure calls a sub-procedure DEFINE GEOMETRIC TEXTURE IN U,V SPACE. That sub-procedure results in the provision of a geometric texture object 87, having a list of vertices V, a list of triangles t, and an array of bins 88.

Following that sub-procedure, in step S1-4 the main procedure defines the object to be rendered as having vertices specified in both x,y,z space and mapping to u,v space.

Subsequently, the main procedure enters a loop, in which each triangle of the object is selected in step S1-6 by the procedure SELECT TRIANGLE OF OBJECT AND MAP GEOMETRIC TEXTURE ONTO IT, which produces a geometrically textured object triangle, composed of a plurality of smaller polygons. That geometrically textured object triangle is then dispatched by step S1-8 down the rendering pipeline 50 of the system as described with reference to FIG. 2.

Once the geometrically textured object triangle has been dispatched, step S1-10 enquires as to whether any more triangles of the body remain to be considered. If another triangle remains, then the procedure returns to step S1-6 and continues as before. Otherwise, once all triangles of the object have been considered, the rendering procedure, including incorporation of geometric texture, is complete, and the procedure ends.

Figure 12:
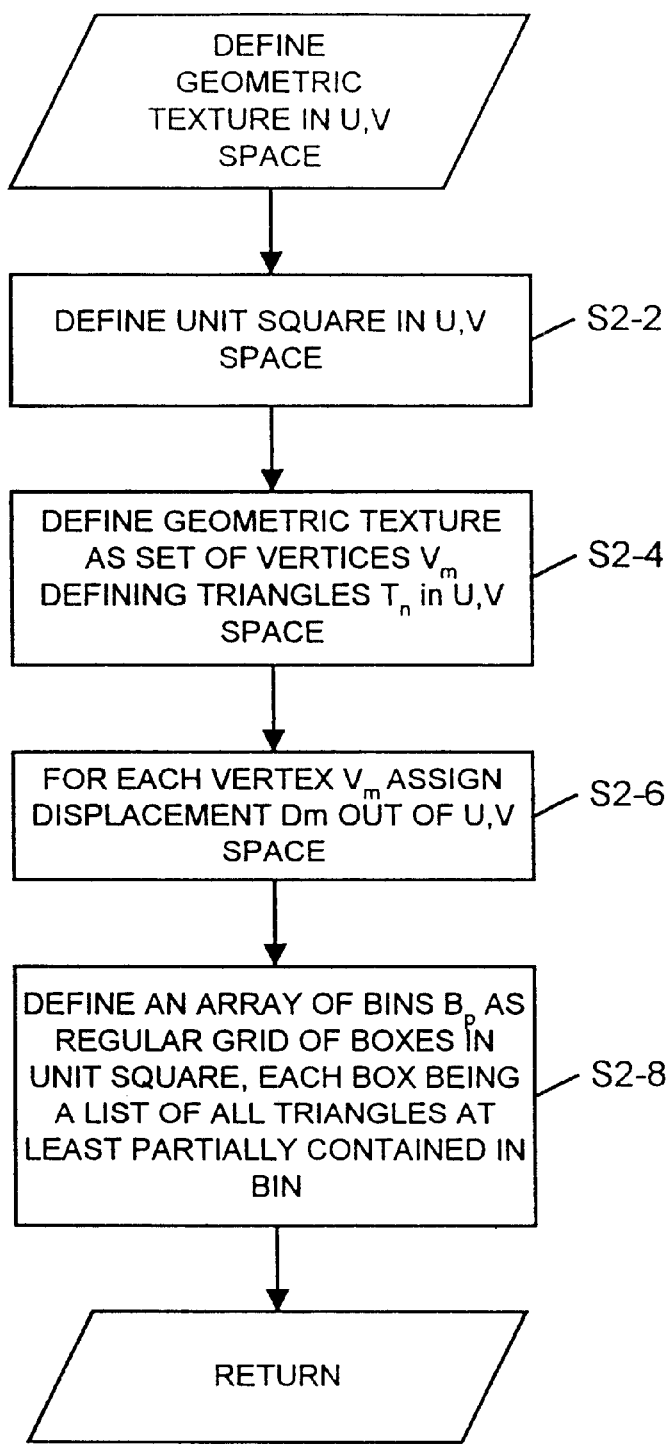
FIG. 12 is a flow diagram illustrating steps included in a DEFINE GEOMETRIC TEXTURE IN U,V SPACE sub-procedure of the procedure illustrated in FIG. 11.

The sub-procedure DEFINE GEOMETRIC TEXTURE IN U,V SPACE will now be described in more detail, with reference to FIG. 12 appended hereto.

Figure 13:
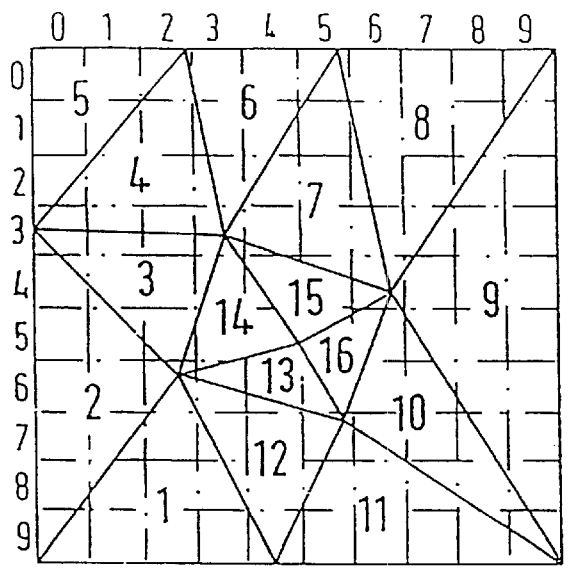
FIG. 13 is a plan view of a second geometric texture in accordance with the first specific embodiment of the present invention.

In step S2-2, the sub-procedure first defines a unit square in u,v space, within which the geometric texture is to be defined. Then, in step S2-4, the geometric texture is defined as a set of vertices $V_m$ within u,v space, and triangles are defined by those vertices. FIG. 13 illustrates a second exemplary embodiment of a geometric texture, including 4 corner vertices as before, and 9 internal vertices, together defining 16 triangles. It will be noted that the second geometric texture is significantly more complicated than the first, which enables the procedure described herein to be described more effectively. The vertices $V_m$ and triangles $t_n$ are stored in the lists of vertices and of triangles of the geometric texture object 87 described with reference to FIG. 5.

Figure 14:
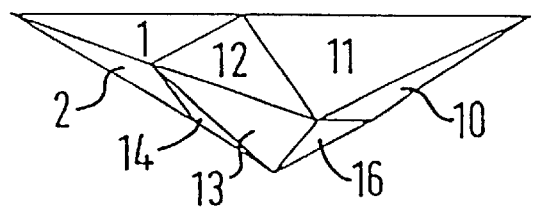
FIG. 14 is an elevation of the geometric texture illustrated in FIG. 13, viewed from the lower edge of the geometric texture as illustrated in FIG. 13.
Figure 15:
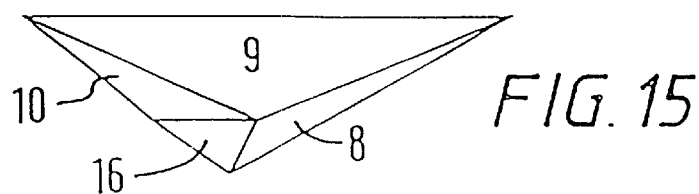
FIG. 15 is an elevation of the geometric texture illustrated in FIG. 13, viewed from the right-hand edge as illustrated in FIG. 13.

By step S2-6, each vertex $V_m$ has assigned thereto a displacement $D_m$ out of the u,v plane. The displacements $D_m$ associated with the vertices $V_m$ define the shape of the geometric texture to be applied to an object. As shown in FIGS. 14 and 15, these displacements $D_m$ can be represented as being perpendicular to the u,v plane. In the presently described embodiment, all of the displacements $D_m$ are negative. However, it will be appreciated that the displacements $D_m$ could be positive, negative or a mixture of both. This might be useful for providing ripple effects, ribs or roughness.

Following step S2-6, step S2-8 defines an array of bins $B_{pq}$ as a regular grid of boxes. In the diagram of FIG. 13, bins are referenced by coordinates along the top edge and the left-hand edge. Therefore, 100 bins are shown, referenced from $B_{00}$ to $B_{99}$.

Each bin $B_{pq}$ has assigned thereto a list of all triangles $t_n$ which are at least partially contained within that bin. For example, with reference to FIG. 13, bin $B_{00}$ has a list containing triangle $t_5$, whereas bin $B_{64}$ has a list containing triangles $t_7$, $t_8$, $t_9$, $t_{10}$, $t_{15}$ and $t_{16}$.

Once all bins $B_{pq}$ have been considered for the triangles contained therein, the geometric texture is considered to be defined in u,v space, and the procedure returns to the main procedure.

The SELECT TRIANGLE OF OBJECT AND MAP GEOMETRIC TEXTURE ONTO IT sub-procedure will now be described with reference to the flow diagram illustrated in FIG. 16.

Firstly, by step S3-2, the object triangle is mapped into u,v space, by referring to the u,v coordinates assigned to each vertex of the object triangle. Then, in step S3-4 a "loose extent" of the triangle in u,v space is calculated by means of the sub-procedure CALCULATE LOOSE EXTENT OF TRIANGLE IN U,V SPACE to be described subsequently. The "loose extent" of a triangle consists of a rectangle being the smallest axis aligned bounding rectangle in the u,v plane with the u,v coordinates of its vertices having integer values.

The previously defined unit square geometric texture is then repeated over the area of the loose extent, by means of step S3-6. These repetitions of the geometric texture are known hereinafter as repetition blocks. A whole number of the repetition blocks will fit within the loose extent, because the coordinates of the loose extent are integer values and each repetition block is a unit square. Since the loose extent is not computationally expensive to obtain, it is a useful tool for limiting the area in u,v space to be considered when applying the geometric texture to the object triangle.

Then, the procedure enters a loop, whereby each repetition block is considered in turn. A block is selected for consideration by step S3-8. The block under consideration has four corners, each of which are vertices of the geometric texture as defined in the list of vertices $V_m$. As noted previously, it is convenient for those vertices to be placed at the top of the list $V_m$ for ease of access.

All of the vertices of the Geometric Texture have a VISITED flag within the FLAGS field associated therewith, and these are initialised to a reset condition in step S3-9 as a preliminary step to later processing. The four identified vertices of the Geometric texture are then selected, and the VISITED flag of each of those vertices is then set, by step S3-10. The VISITED flag-is set to indicate when a vertex of the geometric texture has been considered. It is a useful efficiency measure to prevent recalculation of CLIP FLAGS (to be described later) and possibly other data also. If a vertex is referenced for a second time, its CLIP FLAGS need not be recalculated if its VISITED flag is set.

In step S3-11, the CLIP FLAGS, which are described later, are calculated for each of the corners to establish if they constitute vertices which are not clipped from the object triangle and thus require rendering. If they are not clipped, they are dispatched to the rendering pipeline 50.

Following selection of those corners, which should appear at the top of the list of vertices $V_m$ as previously noted, the overlap of the block with the object triangle in u,v space is ascertained, and the geometric texture is superimposed onto the object triangle in that overlap (if any) by means of the sub-procedure CHECK FOR OVERLAP BETWEEN REPETITION BLOCK AND OBJECT TRIANGLE AND SUPERIMPOSE GEOMETRIC TEXTURE, called in step S3-12. That sub-procedure will be described later.

Figure 29:
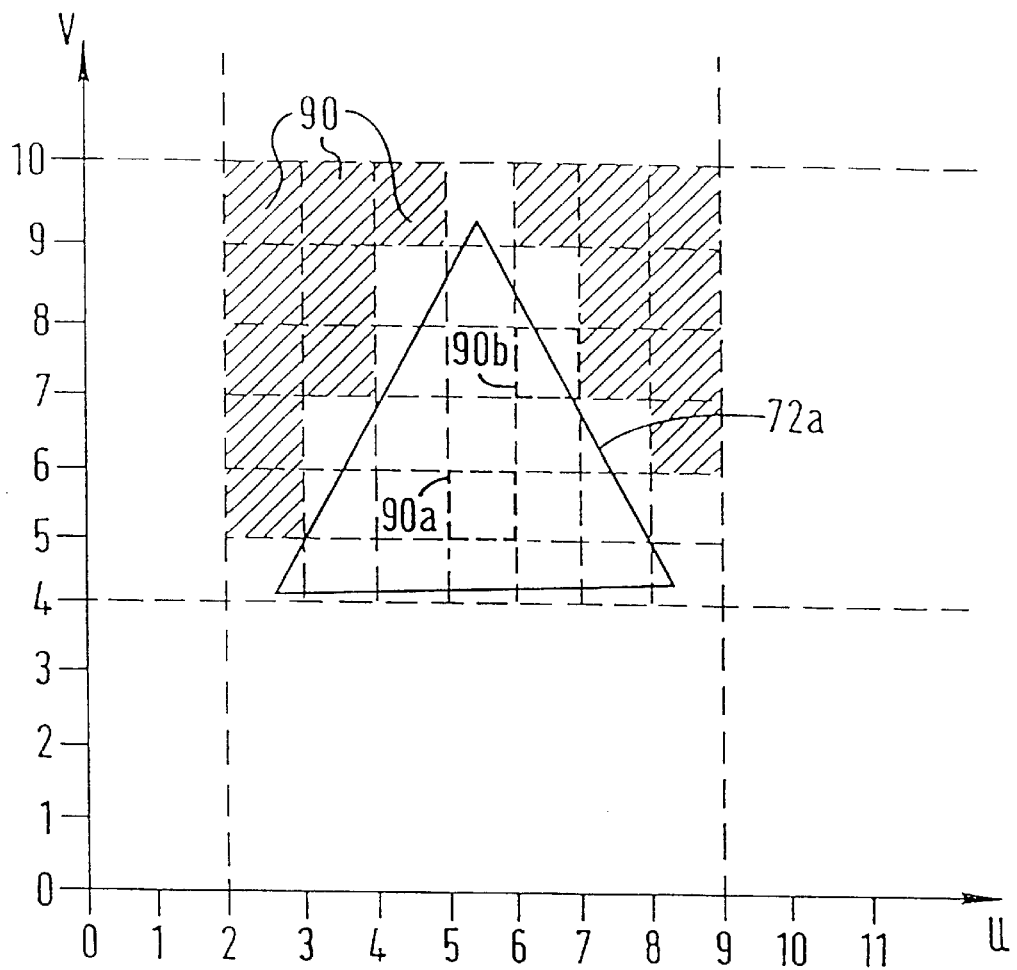
FIG. 29 is a plot, in u,v space, of a first representation of a triangle of the object, illustrated in FIG. 3, to which a geometric texture is to be applied.
Figure 31:
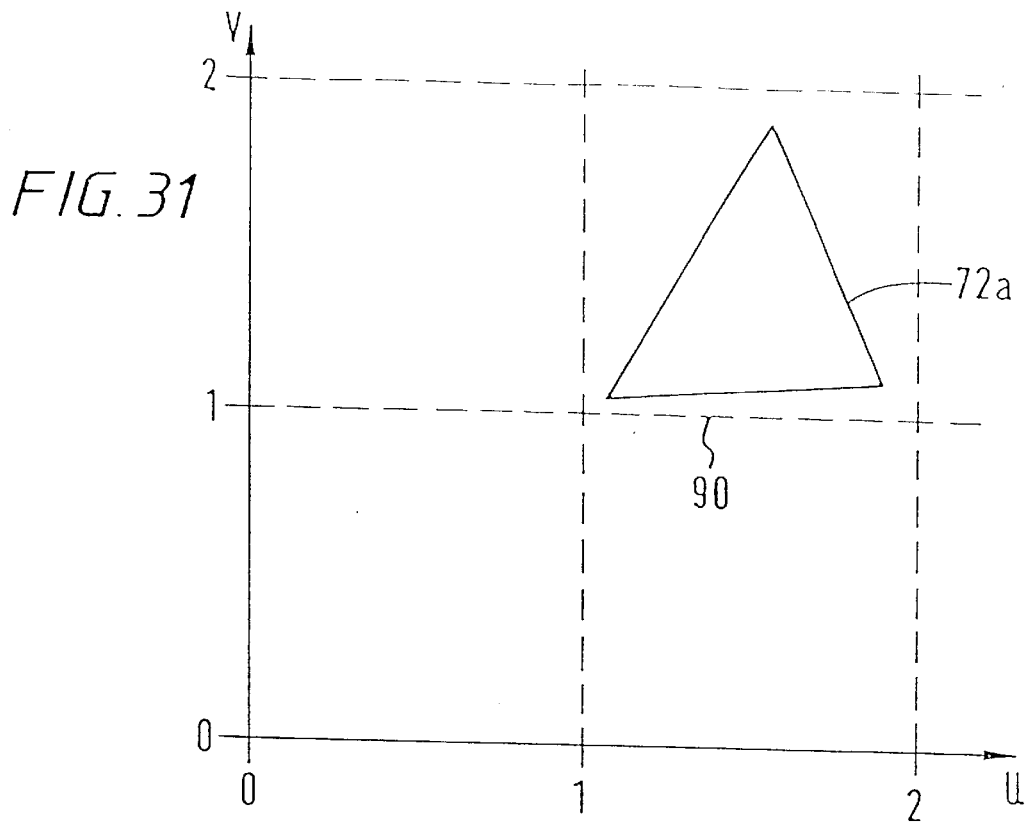
FIG. 31 is a plot, in u,v space, of a second representation of the triangle to which a geometric texture is to be applied.
Figure 33:
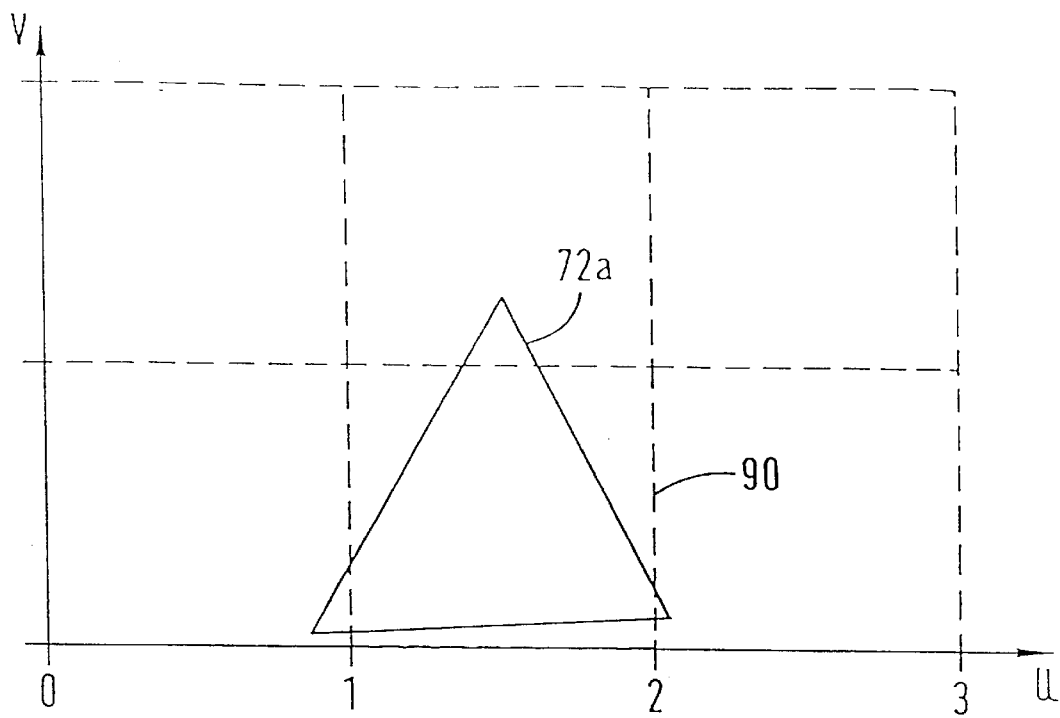
FIG. 33 is a plot, in u,v space, of a third representation of the triangle to which a geometric texture is to be applied.

FIGS. 29, 31 and 33 will now be described to demonstrate different sets of circumstances which must be dealt with when superimposing the geometric texture.

In FIG. 29, the object triangle 72a is shown to cover a plurality of repetition blocks 90 of the geometric texture. One of those repetition blocks 90a is shown as being entirely enclosed within the object triangle 72a. Therefore, the entire geometric texture can be superimposed over that portion of the object triangle. Another repetition block 90b is shown as overlapping one edge of the object triangle 72a. In that case, the geometric texture needs to be clipped to the appropriate shape.

In FIG. 31, the object triangle 72a is shown as being enclosed by a single repetition block 90 of the geometric texture. In that case, only that one repetition block 90 of the geometric texture needs to be considered, and that repetition block 90 needs to be clipped to the shape of the object triangle 72a.

FIG. 33 shows a further scaling of the object triangle 72a, such that for a given repetition block 90 of the geometric texture, none of the vertices of the object triangle 72a fall within the repetition block 90, and nor do any of the corner vertices of the repetition block 90 fall within the object triangle 72a. That special case will be discussed later in reference to the flow chart described in FIG. 18.

Figure 16:
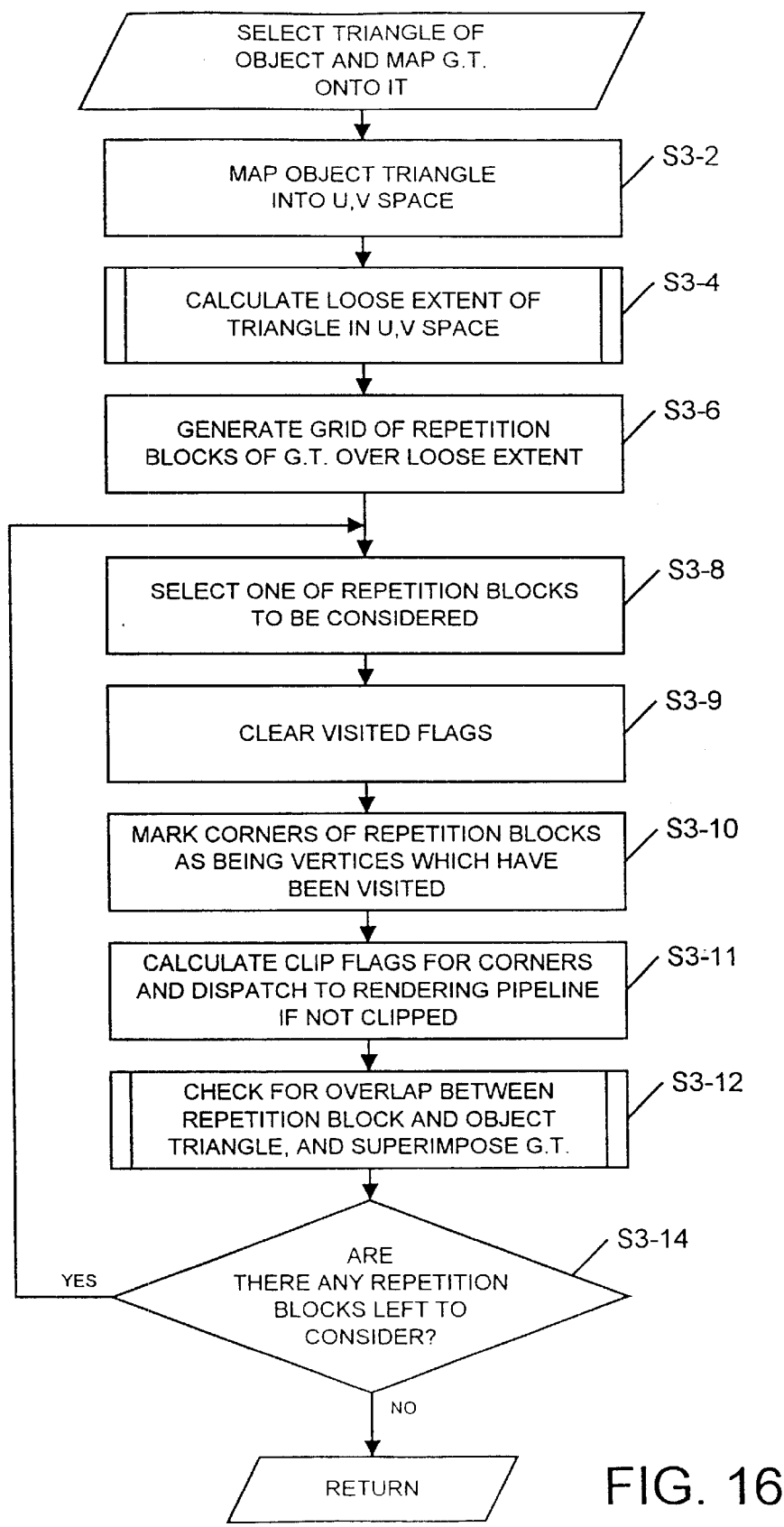
FIG. 16 is a flow diagram illustrating steps included in a SELECT TRIANGLE OF OBJECT AND MAP GEOMETRIC TEXTURE ONTO IT sub-procedure of the procedure illustrated in FIG. 11.

Returning to discussion of FIG. 16, in step S3-14, the sub-procedure enquires as to whether any further repetition blocks 90 remain to be considered. If another block remains, then the sub-procedure loops back to step S3-8 and proceeds as before.

Once all of the repetition blocks 90 have been considered, the sub-procedure SELECT TRIANGLE OF OBJECT AND MAP GEOMETRIC TEXTURE ONTO IT returns to the main procedure.

Figure 17:
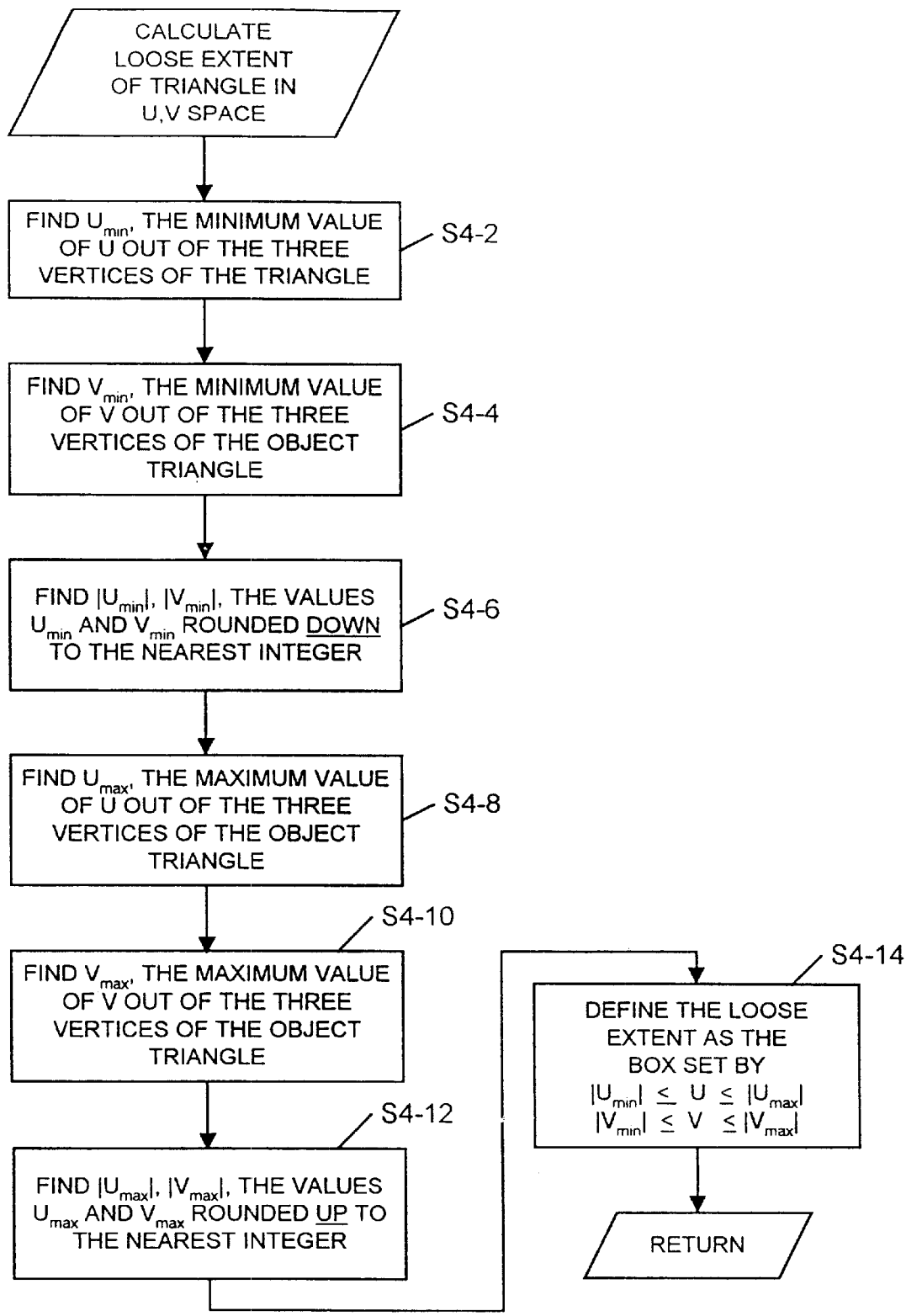
FIG. 17 is a flow diagram illustrating steps included in a CALCULATE LOOSE EXTENT OF TRIANGLE IN U,V SPACE sub-procedure of the sub-procedure illustrated in FIG. 16.

The sub-procedure CALCULATE LOOSE EXTENT OF TRIANGLE IN U,V SPACE, which is called in step S3-4, will now be described with reference to FIG. 17.

Firstly, in steps S4-2 and S4-4, the coordinates of the three vertices of the object triangle 72a in u,v space are considered. Of those three u coordinates and three v coordinates, the minimum values $u_{min}$ and $v_{min}$ are selected.

Following selection of $u_{min}$ and $v_{min}$, step S4-6 finds $|u_{min}|$ and $|v_{min}|$. $|u_{min}|$ and $|v_{min}|$ are defined as the values of $u_{min}$ and $v_{min}$ rounded down to the nearest integer.

Secondly, in steps S4-8 and S4-10, the three u coordinates and three v coordinates of the object triangle are considered, and $u_{max}$ and $v_{max}$ are found, being the maximum values out of the u coordinates and v coordinates respectively. Then, step S4-12 finds $|u_{max}|$ and $|v_{max}|$, being the values of $u_{max}$ and $v_{max}$ rounded up to the nearest integer.

The loose extent of the triangle in u,v space is then defined in step S4-14 as being within the range defined as follows:

$$|u_{min}| \leq u \leq |u_{max}|$$

$$|v_{min}| \leq v \leq |v_{max}|$$

Once the loose extent has been defined, the sub-procedure returns to the SELECT TRIANGLE OF OBJECT AND MAP GEOMETRIC TEXTURE ONTO IT sub-procedure.

The CHECK FOR OVERLAP BETWEEN REPETITION BLOCK AND OBJECT TRIANGLE AND SUPERIMPOSE GEOMETRIC TEXTURE sub-procedure, called by step S3-12 in the SELECT TRIANGLE OF OBJECT AND MAP GEOMETRIC TEXTURE ONTO IT sub-procedure will now be described with reference to FIG. 18 of the drawings.

Firstly, in step S5-2, an enquiry is made as to whether the repetition block under consideration lies wholly outside the object triangle. The sub-procedure making that enquiry DOES BLOCK LIE WHOLLY OUTSIDE OBJECT TRIANGLE? will be described, with reference to FIG. 19, below. The sub-procedure is capable of returning a result that the block definitely lies wholly outside the object triangle (represented by a YES value), or that it cannot be ascertained whether the block lies wholly outside the object triangle (represented by a NOT SURE value). If a YES value is returned, then in step S5-4 the repetition block is marked as rejected. The procedure CHECK FOR OVERLAP BETWEEN REPETITION BLOCK AND OBJECT TRIANGLE AND SUPERIMPOSE GEOMETRIC TEXTURE then returns to the earlier described procedure.

If the sub-procedure DOES BLOCK LIE WHOLLY OUTSIDE OBJECT TRIANGLE? called in step S5-2, returns a NOT SURE value, i.e. it cannot be ascertained whether the block lies wholly outside the object triangle, then in step S5-6 a further sub-procedure DOES BLOCK LIE WHOLLY INSIDE OBJECT TRIANGLE? is called to ascertain whether the block lies wholly inside the object triangle. In this case, a firm positive result (represented by a YES value) or a firm negative result (represented by a NO value) can be obtained.

If a YES value is returned, i.e. The block does lie wholly inside the object triangle, then the repetition block is marked as accepted in step S5-8, and in S5-10 a SUPERIMPOSE GEOMETRIC TEXTURE sub-procedure is called. That sub-procedure will be described later. On completion of that sub-procedure, the CHECK FOR OVERLAP BETWEEN REPETITION BLOCK AND OBJECT TRIANGLE AND SUPERIMPOSE GEOMETRIC TEXTURE sub-procedure returns to the earlier described SELECT TRIANGLE OF OBJECT AND MAP GEOMETRIC TEXTURE ONTO IT procedure.

Should the sub-procedure DOES BLOCK LIE WHOLLY INSIDE OBJECT TRIANGLE? return a NO value, i.e. The block does not lie wholly inside the object triangle, then in step S5-12 a sub-procedure DOES A CORNER OF THE BLOCK LIE INSIDE OBJECT TRIANGLE? is called, which enquires as to whether a corner of the block lies inside the object triangle. That sub-procedure will be described later. The sub-procedure is capable of returning a result that a corner of the block lies inside the object triangle (represented by a YES value) or that no corner of the block lies inside the object triangle (represented by a NO value).

If the sub-procedure returns a YES value, then a sub-procedure FIND TRIANGLE OF GEOMETRIC TEXTURE AT THAT CORNER is called in step S5-14. That sub-procedure identifies a triangle of the geometric texture having as one of its vertices the corner of the geometric texture repetition block identified as lying inside the object triangle. Once that sub-procedure has returned the identity of the triangle, that triangle is designated the STARTING TRIANGLE in step S5-16.

If the sub-procedure DOES A CORNER OF THE BLOCK LIE INSIDE OBJECT TRIANGLE? returns a NO value, then a further enquiry, involving the calling of sub-procedure DOES A VERTEX OF THE OBJECT TRIANGLE LIE INSIDE BLOCK? is made at step S5-18. Sub-procedure DOES A VERTEX OF THE OBJECT TRIANGLE LIE INSIDE BLOCK? is capable of returning a result that a vertex does lie inside the block (represented by a YES value) or that no vertex lies inside the block (represented by a NO value).

If the sub-procedure returns a YES value, then at step S5-20, a sub-procedure FIND TRIANGLE OF GEOMETRIC TEXTURE WITHIN WHICH VERTEX OF OBJECT TRIANGLE LIES is called. That sub-procedure is described in more depth later, but its function is to identify the triangle contained within the list of triangles of the geometric texture within which the identified vertex of the object triangle lies. Once that triangle of the geometric texture has been identified, then at step S5-22, that triangle is designated as the STARTING TRIANGLE.

If the sub-procedure DOES A VERTEX OF THE OBJECT TRIANGLE LIE INSIDE BLOCK? returns a NO value i.e. no vertex of the object triangle lies inside the block, then a further enquiry must be made.

It should be emphasized that the result of the previous enquiries will at this stage have been inconclusive. It cannot be concluded that the block lies outside the object triangle, since the situation illustrated in FIG. 33 will lead to the procedure reaching this stage, as demonstrated later.

At step S5-24, a sub-procedure SCAN THROUGH BINS FOR A STARTING TRIANGLE is called. The result of that sub-procedure will be either that of a suitable starting triangle of the geometric texture falling within the object triangle, or that the block will be marked as rejected since it lies wholly outside the object triangle. At step S5-26, an enquiry is made as to whether the block is marked as rejected (represented by a YES value). If the block is marked as rejected, then the entire procedure returns to the earlier described procedure, and a new block will need to be checked. If the block is not marked as rejected (represented by a NO value), then it can be concluded that the SCAN THROUGH BINS FOR A STARTING TRIANGLE sub-procedure identified a triangle as STARTING TRIANGLE.

However, if a starting triangle has been identified, as a result of steps S5-16, S5-22 or S5-24, then a sub-procedure CLIP BLOCK TO OBJECT TRIANGLE AND SUPERIMPOSE GEOMETRIC TEXTURE is called at step S5-28. Once that sub-procedure has returned, the CHECK FOR OVERLAP BETWEEN REPETITION BLOCK AND OBJECT TRIANGLE AND SUPERIMPOSE GEOMETRIC TEXTURE sub-procedure returns.

Figure 18:
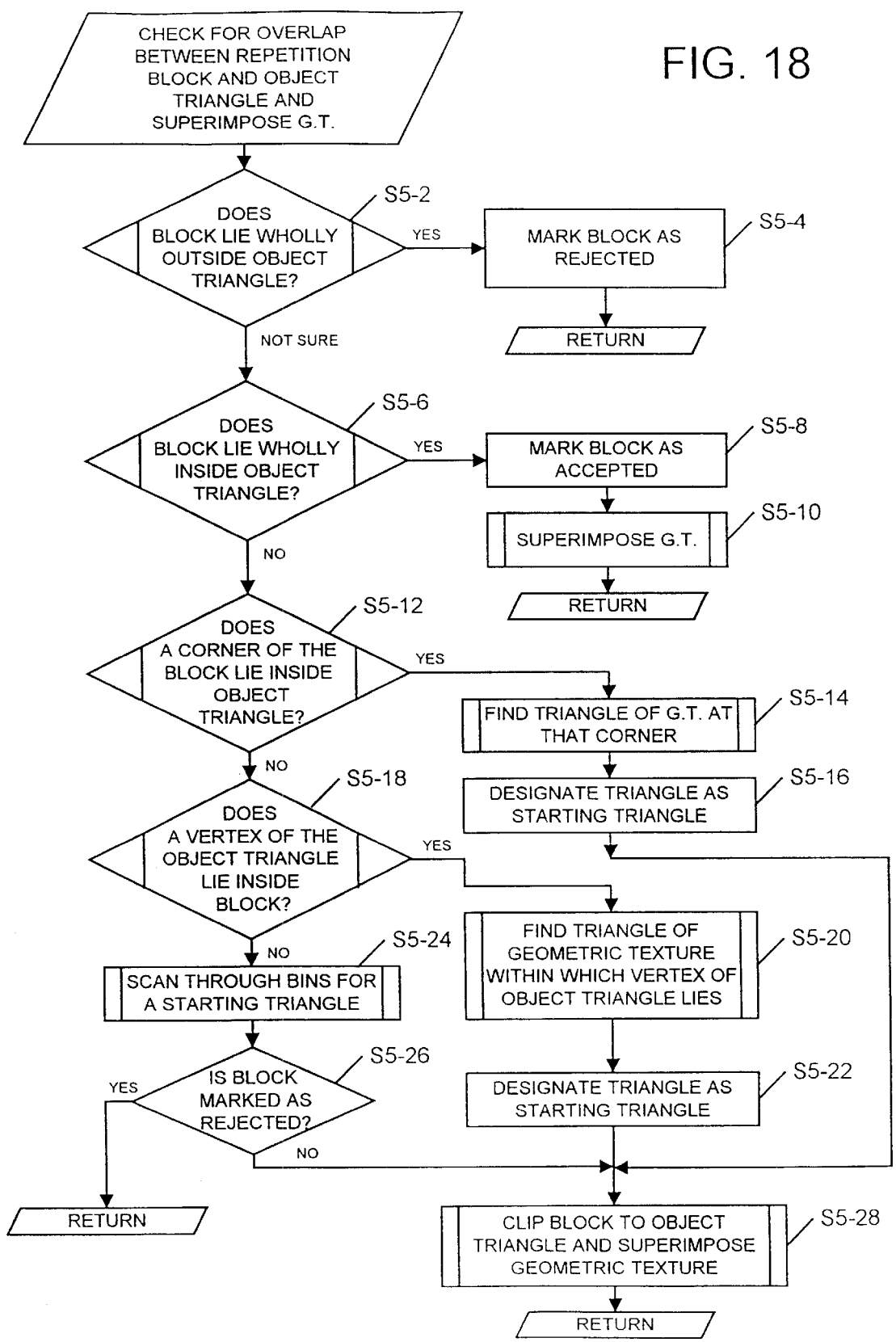
FIG. 18 is a flow diagram illustrating steps included in a CHECK FOR OVERLAP BETWEEN REPETITION BLOCK AND OBJECT TRIANGLE AND SUPERIMPOSE GEOMETRIC TEXTURE sub-procedure of the sub-procedure illustrated in FIG. 16.
Figure 19:
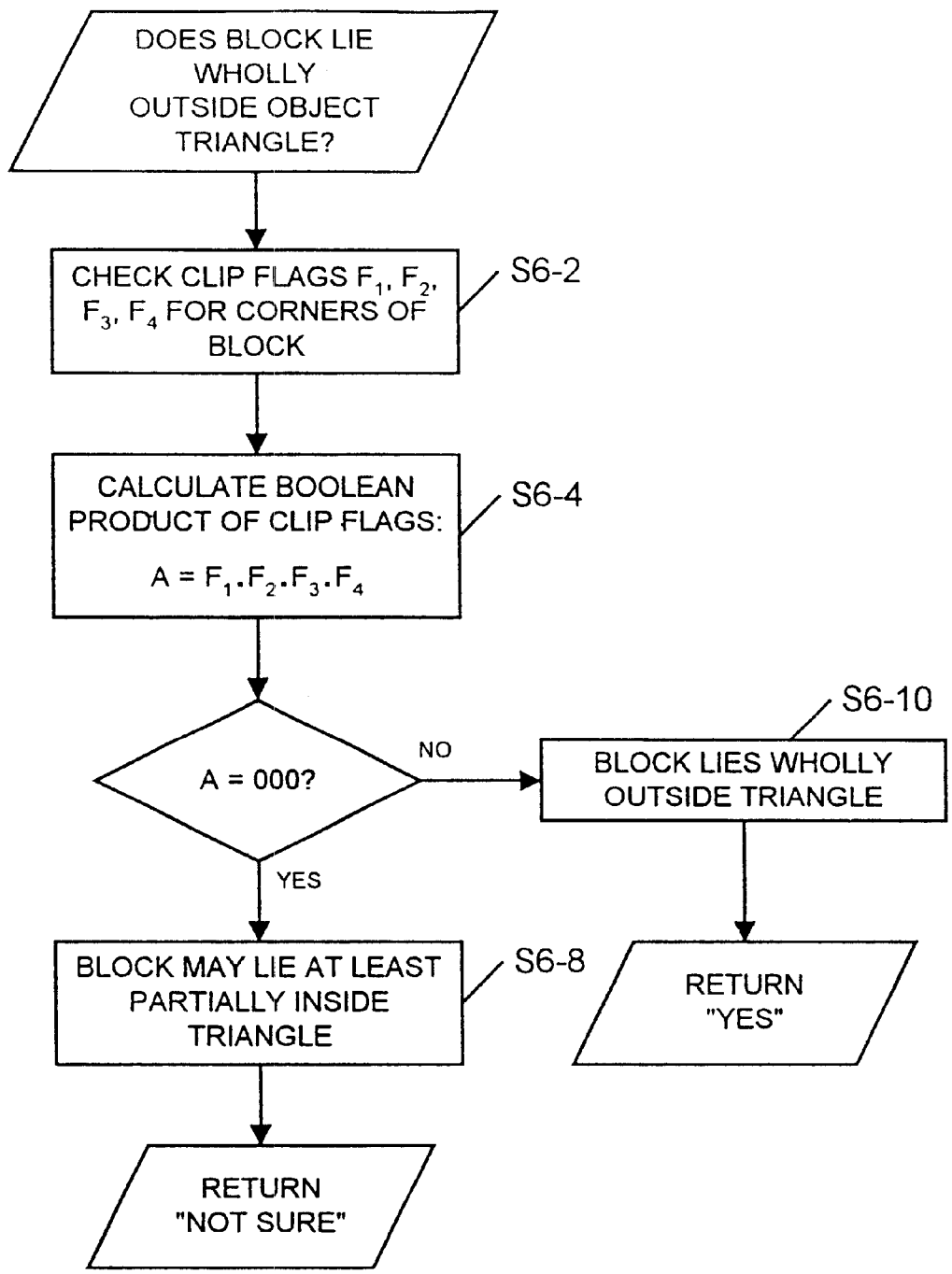
FIG. 19 is a flow diagram illustrating steps included in a DOES BLOCK LIE WHOLLY OUTSIDE OBJECT TRIANGLE? conditional sub-procedure of the sub-procedure illustrated in FIG. 18.

With reference to FIG. 19, the conditional sub-procedure DOES BLOCK LIE WHOLLY OUTSIDE OBJECT TRIANGLE? called at step S5-2 in FIG. 18, will now be described.

Figure 35:
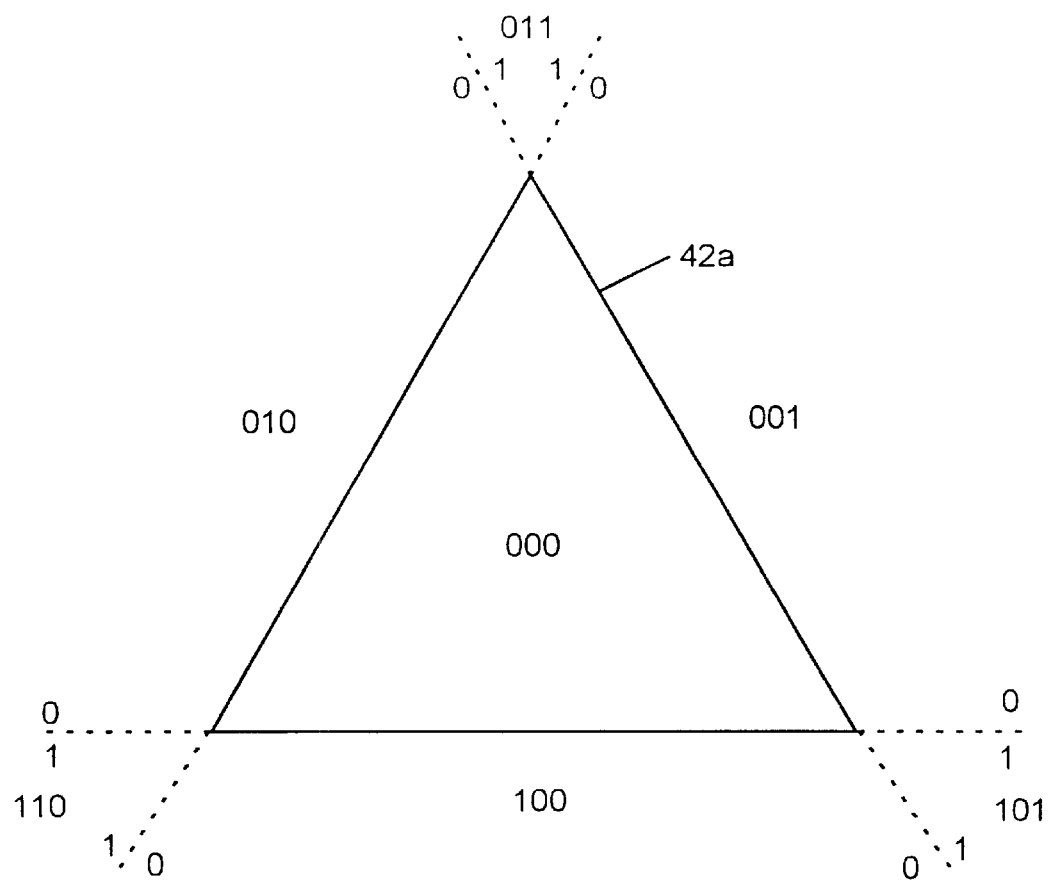
FIG. 35 is a diagram demonstrating a method of ascertaining the position of a point relative the edges of a triangle.

The procedure commences with step S6-2 by checking the CLIP FLAGS $F_1$, $F_2$, $F_3$, $F_4$ of the respective corners of the block. The definition of the CLIP FLAGS will now be described with reference to FIG. 35 of the drawings.

Within the FLAGS field of each vertex, three bits, hereinafter referred to as the CLIP FLAGS, are reserved to indicate on which side of the three lines defining the object triangle the vertex lies. A bit is given a 0 value if the vertex is on the side of the corresponding line containing the object triangle, and a 1 value if the vertex lies on the other side of the line. For example, in FIG. 35, the CLIP FLAGS are shown in relation to regions bounded by the three lines defining the object triangle 72a. It can be seen that the region within the triangle corresponds with the CLIP FLAGS having value 000.

In that way, the position of a point relative the object triangle 72a can be ascertained easily.

Once the CLIP FLAGS for the corners of the repetition block have been obtained, step S6-4 calculates the Boolean product of the CLIP FLAGS:

$$A=F_1 \cdot F_2 \cdot F_3 \cdot F_4$$

At step S6-6, the procedure checks whether the Boolean product A is equal to 000. If A is equal to 000, then, as noted in step S6-8, the block may lie at least partially inside the triangle. Therefore, the procedure returns with a NOT SURE value. However, if A is not equal to 000, then the block must lie wholly outside the triangle, as noted at step S6-10. That is because, in order for A to have a non zero value, all of the corners of the block must lie on the outside of one of the lines defining the triangle. If that is the case, then the procedure returns with a YES result.

Figure 20:
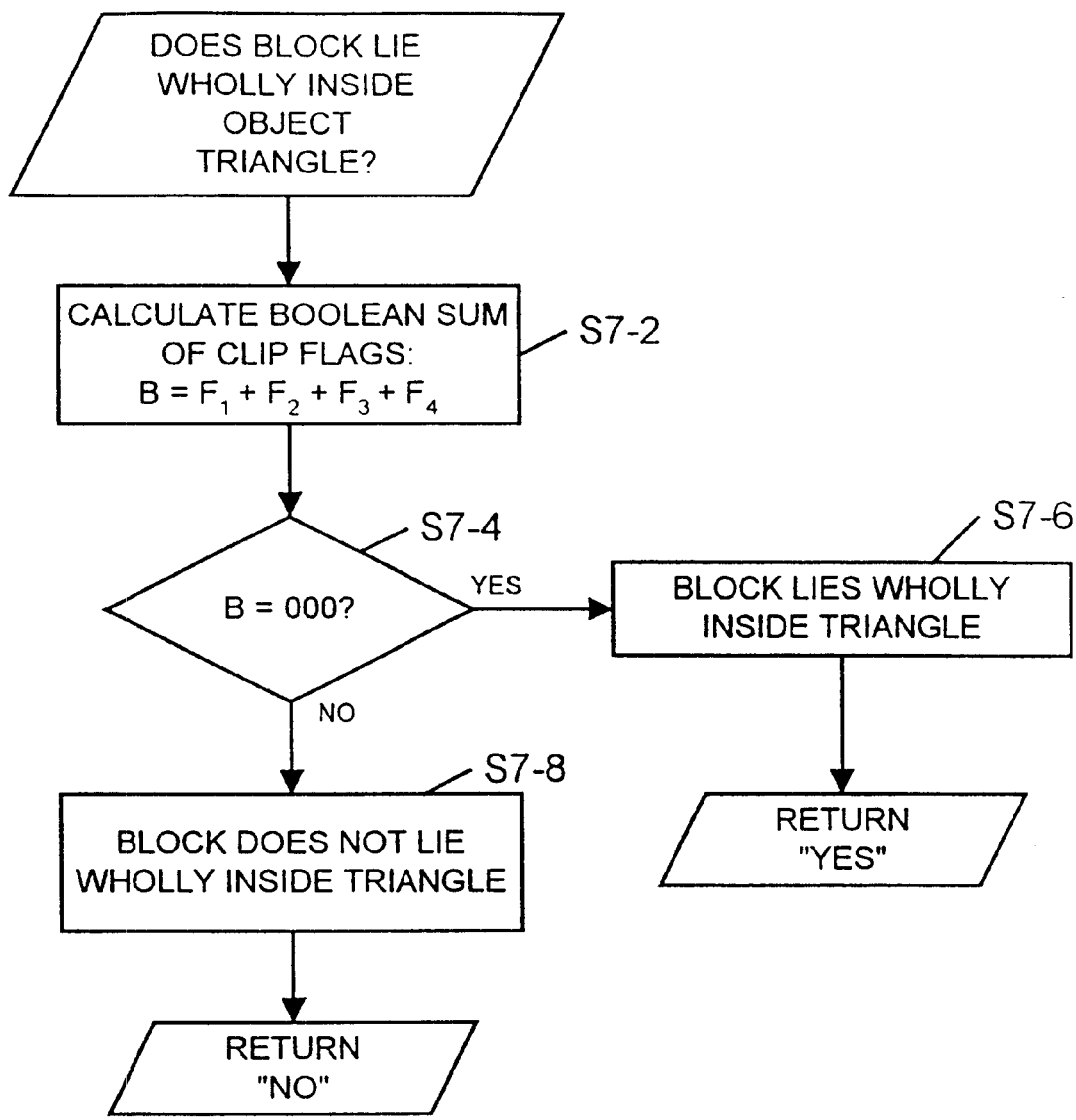
FIG. 20 is a flow diagram illustrating steps included in a DOES BLOCK LIE WHOLLY INSIDE OBJECT TRIANGLE? conditional sub-procedure of the sub-procedure illustrated in FIG. 18.

The conditional procedure DOES BLOCK LIE WHOLLY INSIDE OBJECT TRIANGLE called at step S5-6 in FIG. 18, will now be described with reference to FIG. 20. In this case, the first step S7-2 calculates the Boolean sum of the CLIP FLAGS:

$$B=F_1+F_2+F_3+F_4$$

At step S7-4, the procedure checks as to whether B is equal to 000. If so, the block lies wholly inside the triangle. That is because B will only equal 000 if all of the corners of the block under consideration lie within the region having CLIP FLAG values 000. That region is the region inside the triangle. That is noted at step S7-6 in FIG. 20. The procedure then returns with a YES value. If B is not equal to 000, then, as noted in step S7-8, the block does not lie wholly inside the triangle. In that case, the procedure returns with a NO value.

The SUPERIMPOSE GEOMETRIC TEXTURE procedure, called at step S5-10 in FIG. 18 will now be described with reference to FIG. 21.

Firstly, in step S8-2, a vertex of the geometric texture is selected. Since the entire reference block lies within the object triangle, any vertex can be considered in the first instance, and so it is most convenient to select the first vertex in the list. The vertices can then be considered sequentially.

Then, in step S8-3, an enquiry is made as to whether the flag is set. If it is, then the coordinates of the vertex in x,y,z space will already have been calculated. Otherwise, the VISITED flag is now set in step S8-4, and the SUPERIMPOSE GEOMETRIC TEXTURE procedure calls a CALCULATE COORDINATES OF VERTEX IN X,Y,Z SPACE sub-procedure in step S8-5. That sub-procedure converts the definition of the vertex in u,v space, into x,y,z space on the object triangle and superimposes the Displacement D for that vertex onto those co-ordinates in x,y,z space.

Once the x,y,z coordinates of the vertex have been identified in step S8-5, or retrieved if the vertex has already been visited, step S8-6 sends them to a vertex list stored in memory, and an index is obtained from that list. The index is stored in the index (I) field of the vertex object V in step S8-8. Each of the vertices of the geometric texture is considered in turn in the same way, by checking in step S8-10 whether any more vertices remain to be considered and returning to step S8-2 if so.

Once all of the vertices have been considered, the vertices are sent to the rendering pipeline 50 by step S8-12. Indices for the vertices are returned by the rendering pipeline 50, and these are loaded into the triangle data in place of the vertex references held in the structure illustrated in FIG. 7, by step S8-14. Step S8-16 sends the modified triangles to the rendering pipeline 50, following which the sub-procedure returns. The triangles are modified in order that they reference the submitted vertices, and not the original geometric texture vertices.

Figure 22:
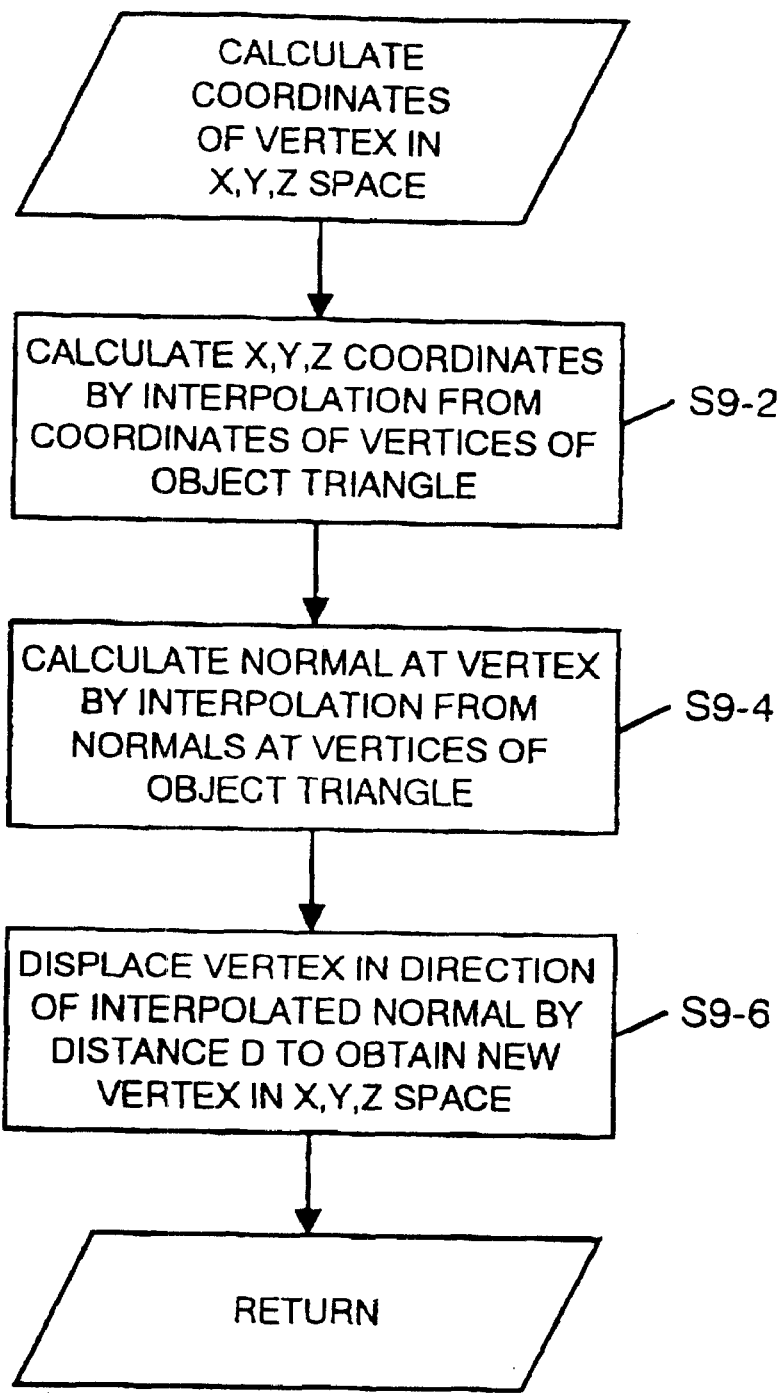
FIG. 22 is a flow diagram illustrating steps included in a CALCULATE COORDINATES OF VERTEX IN X,Y,Z SPACE sub-procedure of the sub-procedure illustrated in FIG. 21.

The CALCULATE COORDINATES OF VERTEX IN X,Y,Z SPACE procedure, called in step S8-5, will now be described with reference to FIG. 22.

Firstly, in step S9-2-the x,y,z coordinates of the vertex are calculated by interpolation from the coordinates of the vertices of the object triangle. Secondly, in step S9-4, the normal at the vertex is calculated by interpolation from normals defined at the vertices of the object triangle. This interpolation need not be exact, in that normals between vertices of the object triangle are unlikely to vary unduly. Therefore, any reduction in the magnitude of the normal from unity, introduced by interpolation of the normals, can be disregarded. Finally, in step S9-6, the vertex $V_i$ is displaced in x,y,z space in the direction of the interpolated normal by a distance $D_i$ as associated with that vertex to obtain a new vertex position in x,y,z space. The procedure then returns.

Figure 23:
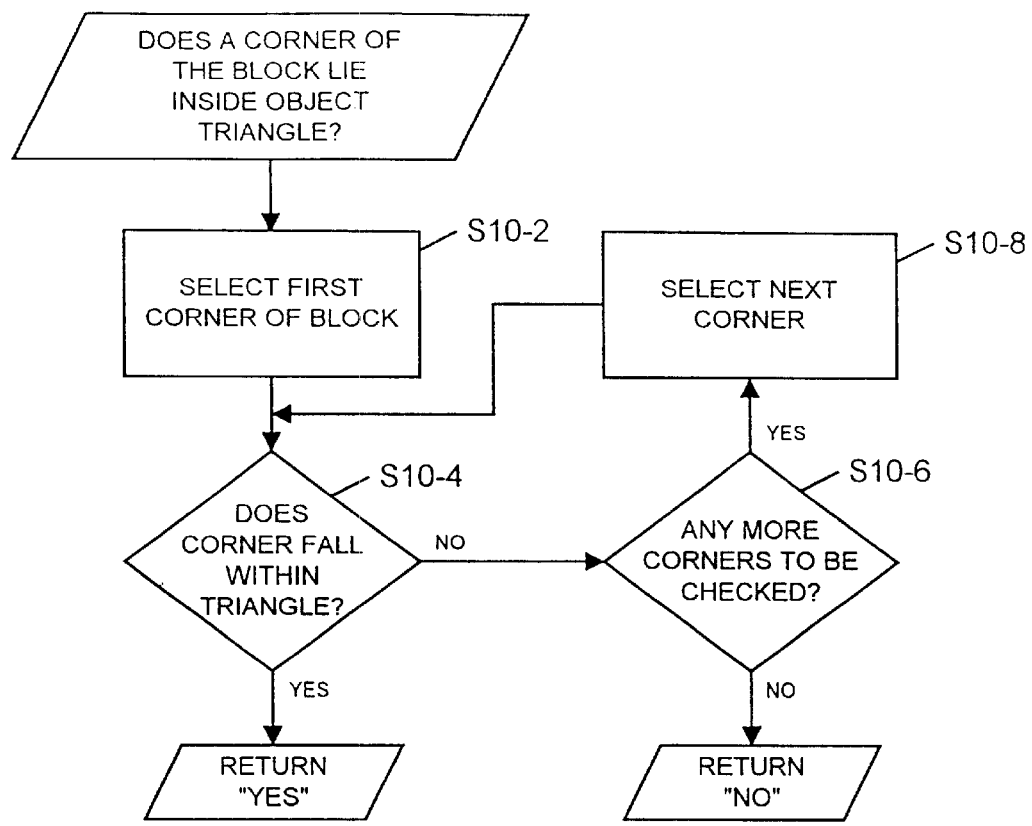
FIG. 23 is a flow diagram illustrating steps included in a DOES A CORNER OF THE BLOCK LIE INSIDE OBJECT TRIANGLE? conditional sub-procedure of the sub-procedure illustrated in FIG. 18.

The conditional sub-procedure DOES A CORNER OF THE BLOCK LIE INSIDE OBJECT TRIANGLE? called at step S5-12 of FIG. 18 will now be described with reference to FIG. 23. Firstly, in step S10-2 a first corner of the repetition block is selected. That first corner will, by the nature of the geometric texture data structure, be listed at the first position in the list of vertices associated with the geometric texture 90. Then, in step S10-4, an enquiry is made as to whether the corner falls within the object triangle. If it does, then the procedure returns with a YES value.

If not, then at step S10-6 an enquiry is made as to whether any more corners of the repetition block remain to be checked. If not, then the procedure returns with a NO value. However, if another corner remains to be checked, then at step S10-8, a next corner of the block is selected and the procedure continues from step S10-4 onwards, until either no more corners remain to be checked or a corner is found which lies inside the object triangle.

Figure 24:
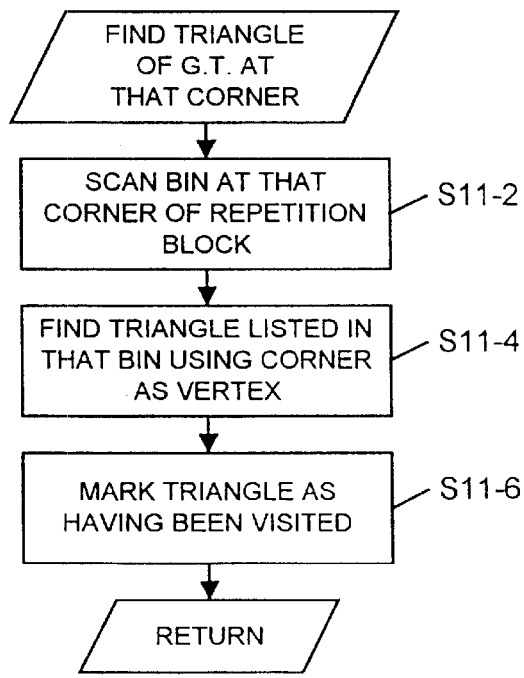
FIG. 24 is a flow diagram illustrating steps included in a FIND TRIANGLE OF GEOMETRIC TEXTURE AT THAT CORNER sub-procedure of the sub-procedure illustrated in FIG. 18.

In FIG. 24, the sub-procedure FIND TRIANGLE OF GEOMETRIC TEXTURE AT THAT CORNER, called at step S5-14 in FIG. 18, is illustrated and will now be described. The procedure commences with step S11-2 which scans the bin 88 of the geometric texture at that corner of the repetition block. The bin contains a list of triangles, at least partially coincident with the region corresponding with the bin, and at step S11-4 a triangle listed in that bin which uses the corner as a vertex is found. That triangle is marked as having been visited in step S11-6. The procedure then returns.

Figure 25:
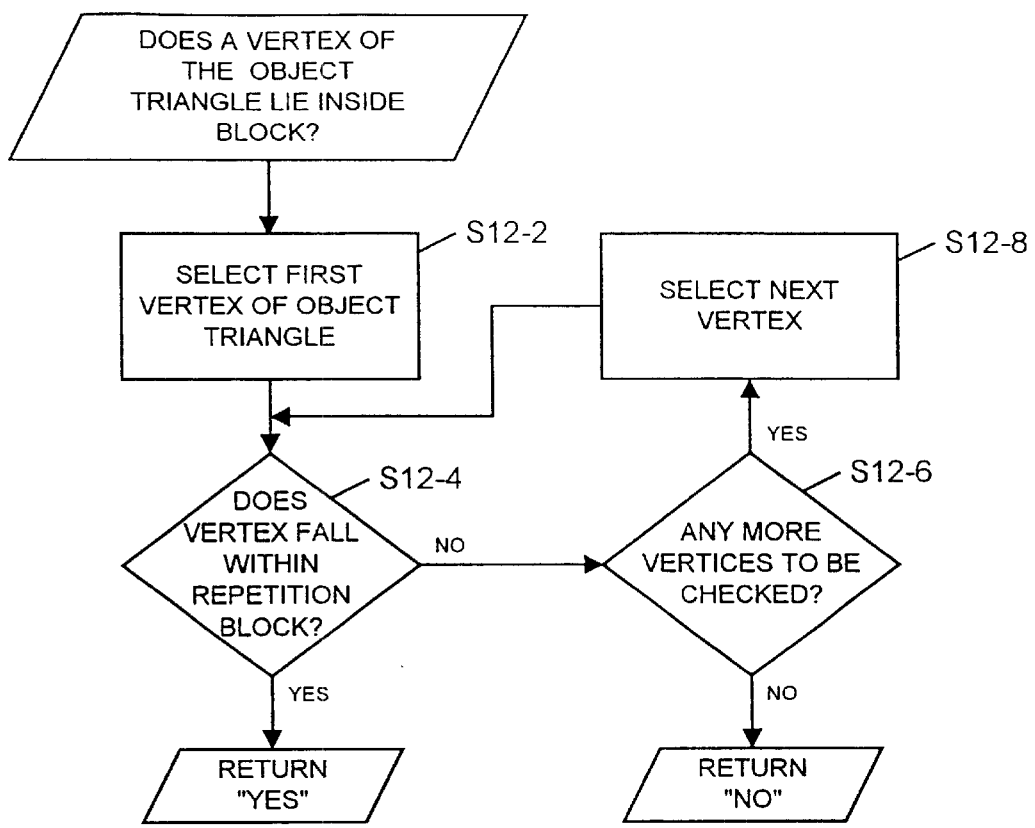
FIG. 25 is a flow diagram illustrating steps included in a DOES A VERTEX OF THE OBJECT TRIANGLE LIE INSIDE BLOCK? conditional sub-procedure of the sub-procedure illustrated in FIG. 18.

The conditional procedure DOES A VERTEX OF THE OBJECT TRIANGLE LIE INSIDE THE BLOCK? will now be described with reference to FIG. 25. The procedure commences in step S12-2 by selecting a first vertex of the object triangle. An enquiry is then made in step S12-4 as to whether the vertex falls within the repetition block. If it does, then the procedure returns with a YES value. If not, then a further enquiry is carried out at step S12-6 to ascertain whether any more vertices of the object triangle remain to be checked. If not, then the procedure returns with a NO value. However, if a vertex remains to be checked, then at step S12-8 a new vertex is selected for consideration and the procedure continues from step S12-4.

The procedure continues until either no more vertices remain to be checked or a vertex of the object triangle is found which lies within the block.

Figure 26:
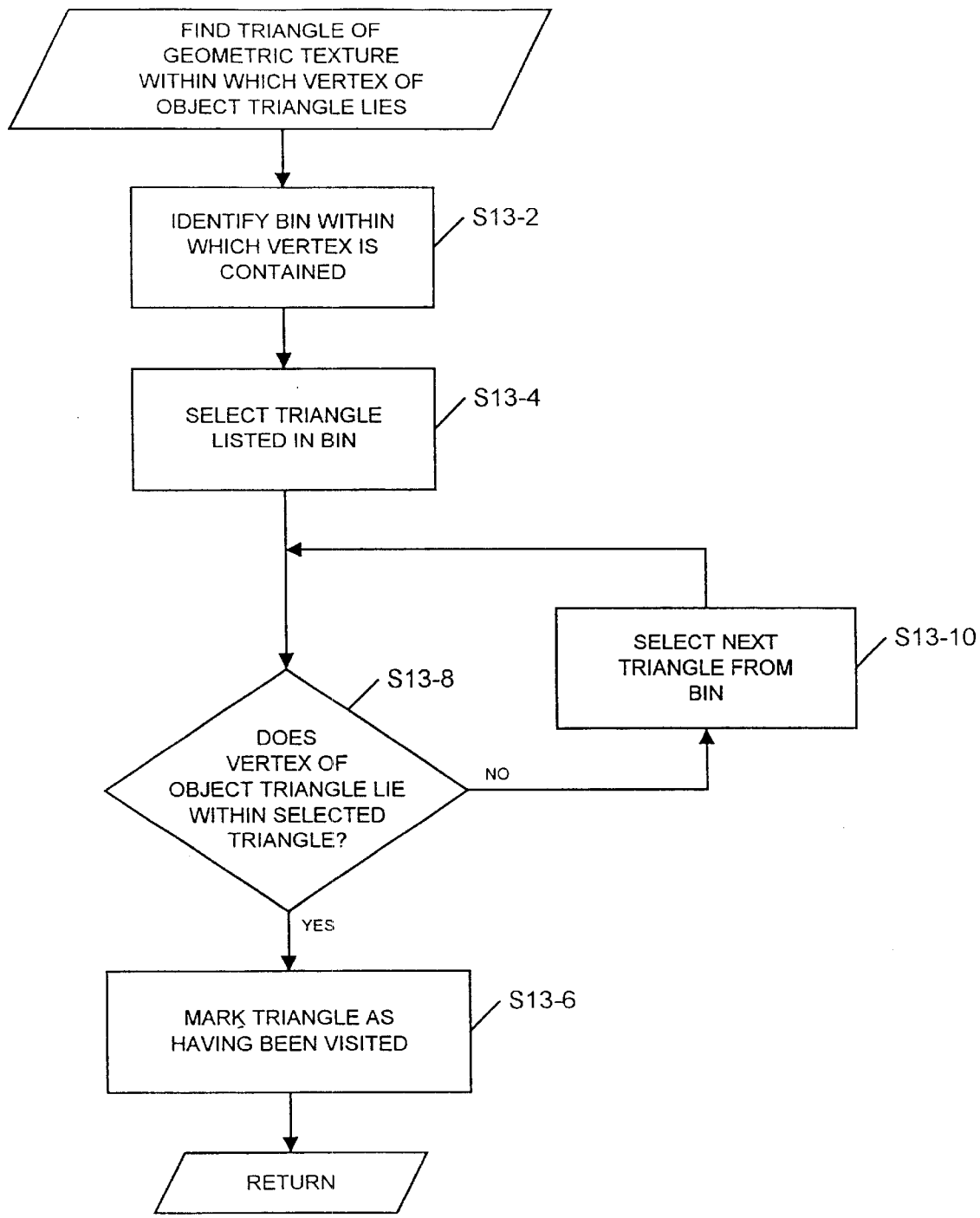
FIG. 26 is a flow diagram illustrating steps included in a FIND TRIANGLE OF GEOMETRIC TEXTURE WITHIN WHICH VERTEX OF OBJECT TRIANGLE LIES sub-procedure of the sub-procedure illustrated in FIG. 18.

With reference to FIG. 26, the sub-procedure FIND TRIANGLE OF GEOMETRIC TEXTURE WITHIN WHICH VERTEX OF OBJECT TRIANGLE LIES will now be described. The sub-procedure is called at step S5-20 in FIG. 18. The sub-procedure commences with step S13-2 which identifies the bin $B_{ij}$ within which the vertex is contained. That bin contains a list of triangles of a geometric texture at least partially coincident with the region corresponding with the bin, and step S13-4 selects a triangle, listed in that bin, for consideration.

In step S13-8, an enquiry is made as to whether the vertex of the object triangle under consideration lies within the selected triangle. If it does, then the triangle has been found, the VISITED flag for the triangle is set in step S13-6, and the procedure returns. If not, then, at step S13-10, the next triangle is selected from the bin, and the procedure resumes from step S13-8 onwards. Eventually, the triangle listed in the bin which contains the vertex of the object triangle will be found by this procedure.

Figure 27:
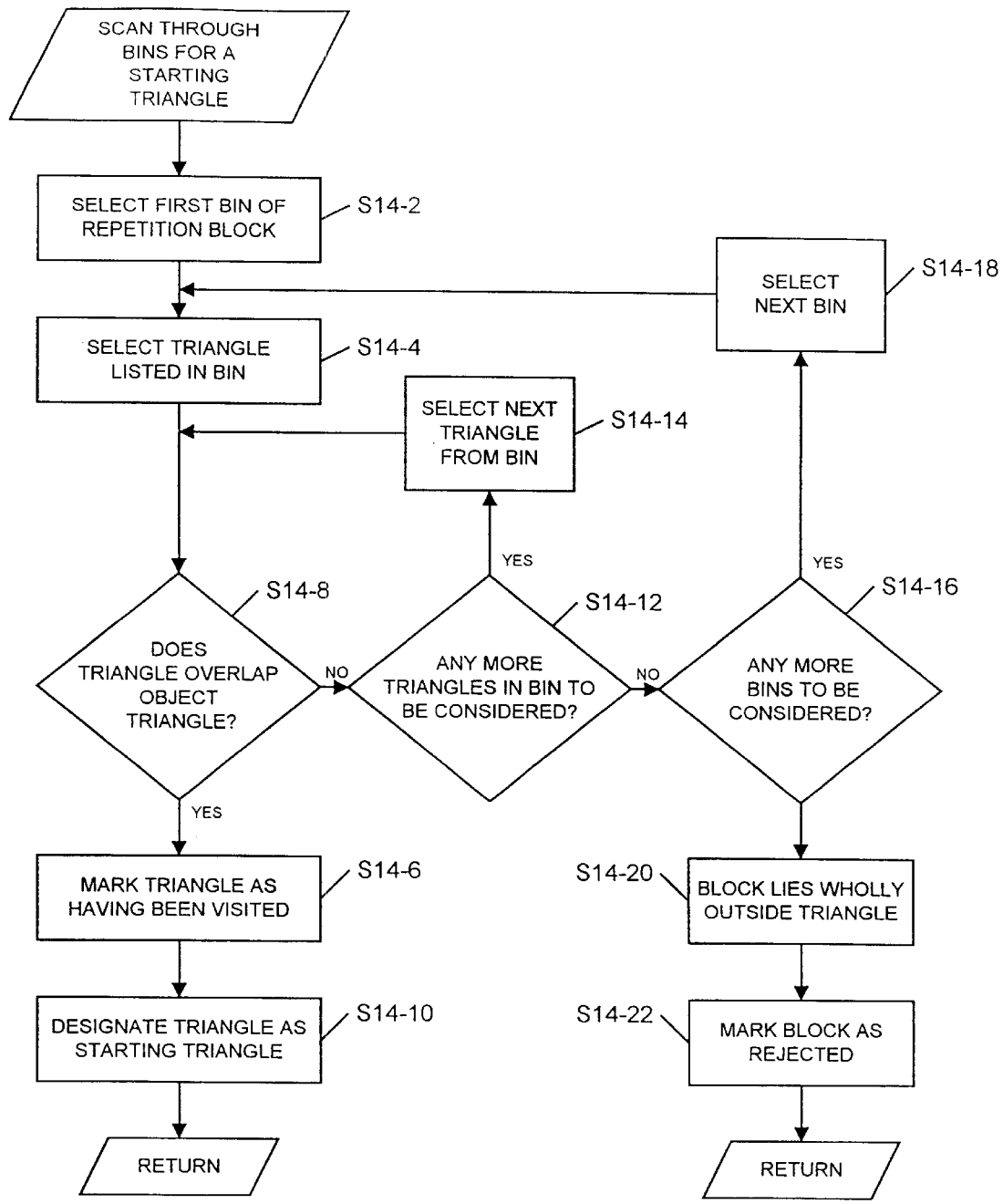
FIG. 27 is a flow diagram illustrating steps included in a SCAN THROUGH BINS FOR A STARTING TRIANGLE sub-procedure of the sub-procedure illustrated in FIG. 18.

The SCAN THROUGH BINS FOR A STARTING TRIANGLE procedure, called at step S5-24 in FIG. 18 will now be described with reference to FIG. 27. In step S14-2, the first bin of the repetition block is selected for consideration. The first bin could be considered as bin $B_{00}$, or by another method of selecting a first item from a two-dimensional array.

A first triangle listed in that bin is then selected for consideration in step S14-4. An enquiry is then made in step S14-8 as to whether the triangle overlaps the object triangle. If that is the case, then that triangle is designated in step S14-10 as the STARTING TRIANGLE. That triangle is marked as having been visited in step S14-6. The procedure then returns.

However, if the result of the enquiry of step S14-8 is negative, then a further enquiry is made in step S14-12, as to whether any more triangles are listed in that bin which have not yet been visited. If that is the case, then a new triangle from the bin is selected in step S14-14 and the procedure resumes from step S14-6 onwards. If no more triangles remain in that bin, then a further enquiry is made in step S14-16 as to whether any more bins remain to be considered. If so, then a new bin is selected in step S14-18, and the procedure resumes from step S14-4 onwards. However, if no more bins remain to be considered, and no triangle has been found which overlaps the object triangle, then, as noted in step S14-20, the block lies wholly outside the triangle. In that case, the block is marked as "rejected" in step S14-22 and the procedure returns.

With respect to FIG. 28, the CLIP BLOCK TO OBJECT TRIANGLE AND SUPERIMPOSE GEOMETRIC TEXTURE sub-procedure will now be described. This sub-procedure is called by step S5-28 in the CHECK FOR OVERLAP BETWEEN REPETITION BLOCK AND OBJECT TRIANGLE AND SUPERIMPOSE GEOMETRIC TEXTURE sub-procedure as illustrated in FIG. 18. In step S15-2, the procedure selects the STARTING TRIANGLE dispatched previously.

Then, in step S15-4, all three vertices of the triangle identified as the STARTING TRIANGLE are considered. An enquiry is made in step S15-6 as to whether all three vertices lie within the object triangle. That can be carried out using the CLIP FLAGS as previously described. These may need to be calculated, or they may be cached with the vertex if the vertex has been visited before for this repetition block.

If all three vertices lie within the object triangle, then the triangle is dispatched to the rendering pipeline in step S15-8. If not, then in step S15-10 the triangle is clipped to the shape of the object triangle, and the clipped shape is dispatched to the rendering pipeline. In that case, an enquiry is then made in step S15-12 as to whether two out of the three vertices of the triangle of the geometric texture and the edge defined thereby lie outside the object triangle. If that is the case, then the neighbouring triangle of the geometric texture is "clipped out" in step S15-14, as it is guaranteed not to lie within the object triangle. Clipping out can be carried out by setting the VISIT flag so that no further consideration of that triangle is then carried out.

Once the triangle or the clipped shape have been passed to the rendering pipeline, an enquiry is made in step S15-16 as to whether any neighbouring triangles to that triangle under consideration exist which have neither been clipped out nor visited before. If a neighbour remains to be considered, then it is selected for consideration in step S15-18 and considered in the same way from step S15-4 onwards. If no neighbours remain, then a check is made in step S15-20 as to whether the triangle under consideration is the first triangle to be considered. If it is the first triangle, then the sub-procedure can be considered to have ended, and so it will return. Otherwise, the sub-procedure reverts in step S15-22 to consideration of the previously considered triangle. A record can be kept of the order in which triangles are considered by means of a linked list stored in memory. That previously considered triangle is then considered again in step S15-16 to establish if any neighbouring triangles remain which have neither been clipped out nor visited before.

It can be seen that once all triangles of the geometric texture have been found which overlap the object triangle, then the procedure considers successively earlier triangles in the linked list containing the order of consideration of triangles. Eventually consideration will pass back to the first triangle to be considered, and the sub-procedure will return. Three examples will now be given of the operation of the CLIP BLOCK TO OBJECT TRIANGLE AND SUPERIMPOSE GEOMETRIC TEXTURE PROCEDURE.

Figure 30:
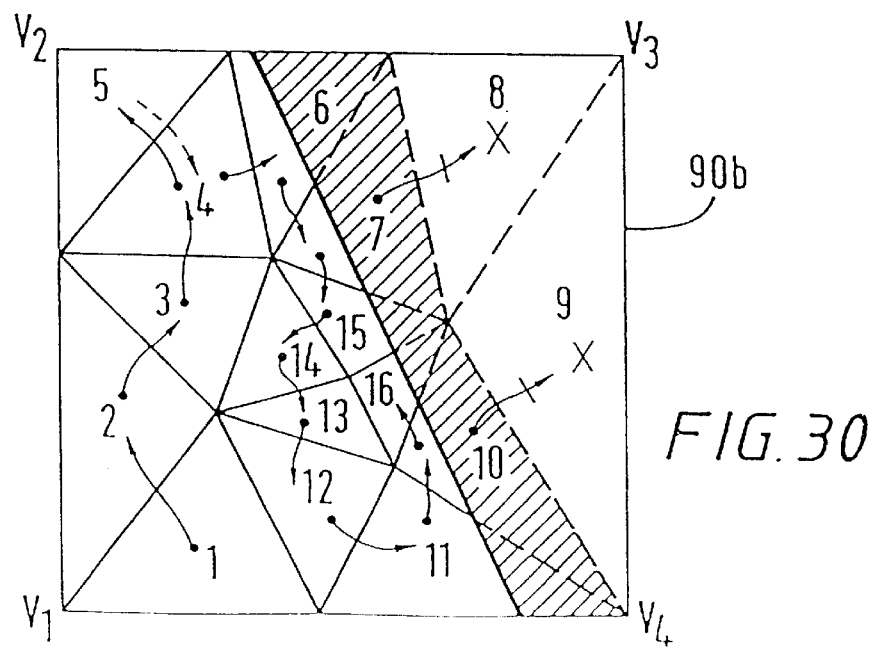
FIG. 30 is a diagram showing the application of the procedure illustrated in FIG. 18 to a block of the object triangle illustrated in FIG. 29.

Firstly, repetition block 90b indicated in FIG. 29 is shown in more detail in FIG. 30. The procedure set out in FIG. 18 will be set out in relation to that repetition block. Initially, step S5-2 is performed, in which the Boolean product of the clip flags for the corners of the block is found to be zero, because not all corners lie to one side of the triangle. Therefore, a NOT SURE value is returned.

In step S5-6, the Boolean sum is found to be non-zero, because two corners lie outside the triangle. Therefore, that step returns a NO result, and step S5-12 is performed. With reference to FIG. 23, $V_1$ is found to lie within the object triangle 72. Then, with reference to step S5-14 and FIG. 24, the bin $B_{09}$ at that corner is scanned in step S11-2 to identify a triangle $t_1$ (see FIG. 13) which uses the corner $V_1$ as a vertex. That triangle $t_1$ is marked in step S11-6 as having been visited, by setting its VISIT flag. In step S5-16, the triangle $t_1$ is designated as STARTING TRIANGLE.

Figure 28:
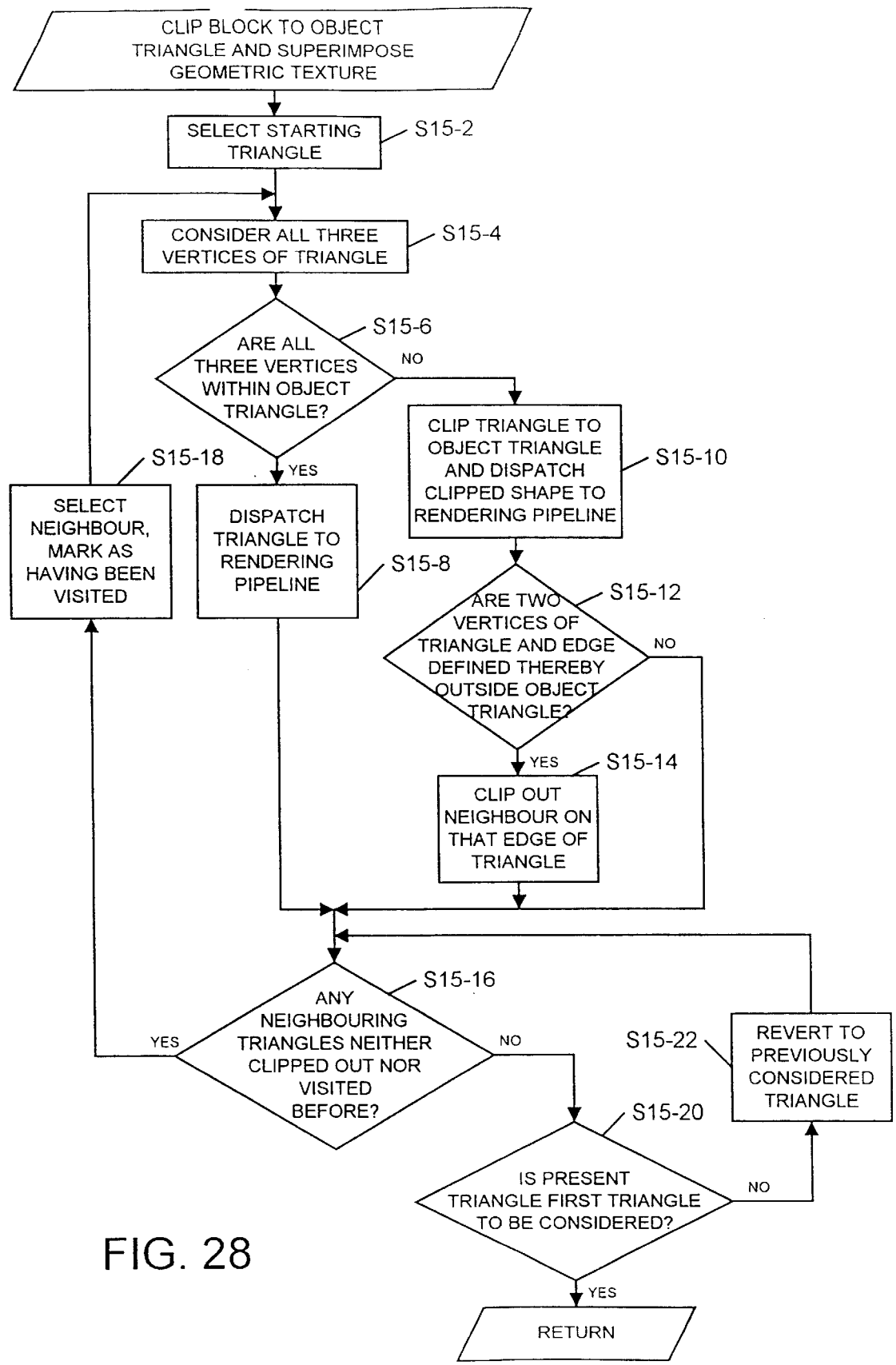
FIG. 28 is a flow diagram illustrating steps included in a CLIP BLOCK TO OBJECT TRIANGLE AND SUPERIMPOSE GEOMETRIC TEXTURE sub-procedure of the sub-procedure illustrated in FIG. 18.

Then, with reference to step S5-28 and FIG. 28, the three vertices of triangle $t_1$ are considered in step S15-4, and all are found to be within the object triangle in step S15-6. Therefore, triangle $t_1$ is wholly within the object triangle 72. The triangle $t_1$ is dispatched to the rendering pipeline 50 in step S15-8, and a neighbouring triangle $t_2$ is found in step S15-16 which has neither been clipped out nor visited before.

Consideration passes to $t_2$, which is marked as having been visited by setting its VISIT flag in step S15-18. $t_2$ is also found in step S15-6 to have all three vertices within the object triangle, following which it is dispatched to the rendering pipeline in step S15-9 in the same way.

Triangles $t_3$ and $t_4$ are considered in the same way with the same result. After consideration of $t_4$, the procedure finds a neighbouring triangle $t_5$ which also lies within the object triangle and so is dispatched to the rendering pipeline. However, that triangle $t_5$ does not have any neighbouring triangles which have neither been clipped out nor visited before. That triangle is not the first triangle to be considered and so in step S15-22 the procedure reverts back to the previously considered triangle $t_4$. $t_4$ is then checked again to establish if any other neighbouring triangles have neither been clipped out nor visited before. One such triangle $t_6$ is found, and its vertices are considered.

One of the vertices of $t_6$ lies outside the object triangle. Therefore, $t_6$ must be clipped in step S15-10 to the object triangle, and then the clipped shape is dispatched to the rendering pipeline. The part of the triangle $t_6$ which is not dispatched is shaded in FIG. 30. At step S15-12, it is found that only one of the vertices of triangle $t_6$ lies outside the object triangle, and so the procedure progresses to step S15-16 to check for neighbouring triangles neither clipped out nor visited before.

Triangle $t_7$ is found, which also does not have all three vertices within the object triangle. Therefore, clipping of that triangle occurs. In this case, triangle $t_7$ has two vertices of the triangle and the edge defined thereby lying outside the object triangle. Therefore, the neighbour along that edge, $t_8$, must lie wholly outside the object triangle and can be clipped out in step S15-14. Clipping out is achieved by setting the VISIT flag for that triangle. With $t_7$ still under consideration, a neighbour $t_{15}$ is found. That triangle is clipped in the usual way, and then the procedure runs through triangles $t_{14}$, $t_{13}$, $t_{12}$, $t_{11}$, and $t_{10}$, before clipping out triangle $t_9$.

Then, triangle $t_{16}$ is considered, which, it is found, has no neighbouring triangles which have neither been clipped out nor visited before. This situation now applies to all triangles which have been considered, and so the procedure counts back through the triangles until reaching triangle ti again. At that point, the procedure returns.

Figure 32:
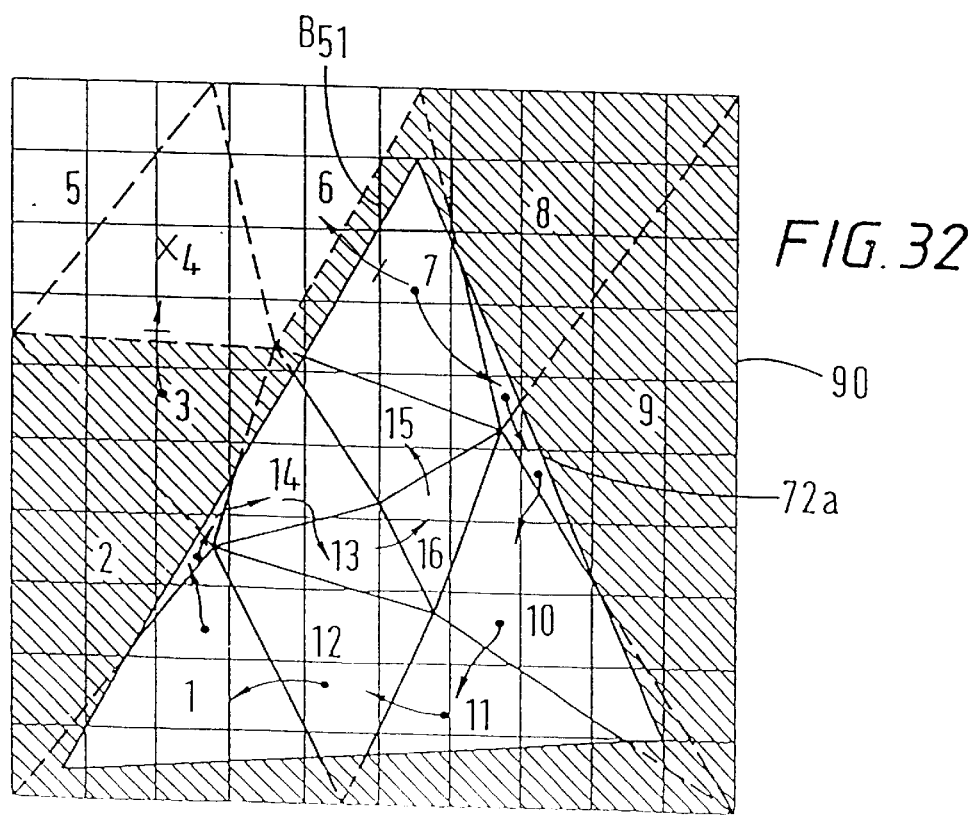
FIG. 32 is a diagram showing the application of the procedure illustrated in FIG. 18 to the triangle illustrated in FIG. 31.

A second example is illustrated in FIG. 31 and FIG. 32. In this case, the reference block 90 entirely contains the object triangle 72a. Accordingly, a NOT SURE result is obtained from step S5-2 and a NO result is obtained from step S5-6. No corners of the block lie within the object triangle, and so a NO result is obtained from step S5-12.

However, all of the vertices of the object triangle lie within the block 90. Therefore, once one of those vertices is found in step S5-18, a bin is found at step S13-2 (FIG. 26) which contains that vertex of the object triangle. In this case, bin $B_{51}$ is identified. That bin $B_5$, contains a list of triangles $t_6$, $t_7$ and $t_8$. Triangle $t_6$ is selected in step S13-4.

However, the object triangle does not have a vertex within triangle $t_6$. Therefore, triangle $t_6$ is rejected, and $t_7$ is then selected from the bin $B_{51}$. The object triangle has a vertex within triangle $t_7$ and so all three vertices of the triangle are considered in step S15-4. It is found that only one of those three vertices lies within the object triangle, and so clipping must take place in step S15-10. Furthermore, the edge defined by the other two vertices also lies outside the object triangle, and so the neighbour along that edge, namely triangle $t_6$, is clipped out at step S15-4.

The procedure as previously described is then repeated in respect of triangles $t_8$, $t_9$, $t_{10}$, $t_{11}$, $t_{12}$, $t_1$, $t_2$ and $t_3$, at which point it is found that triangle $t_4$ can also be clipped out through being a neighbour along the edge of $t_3$ which lies entirely outside the object triangle. The procedure concludes by considering triangles $t_{14}$, $t_{13}$, $t_{16}$ and $t_{15}$, at which point all neighbours of $t_{15}$ are found as having been visited before. Therefore, the procedure counts back through the previously considered triangles, until reaching triangle $t_7$ again when the procedure returns. It is to be emphasised that in this case triangle $t_5$ is not considered at all, since triangle $t_4$, the only neighbour to $t_5$, is clipped out as lying wholly outside the object triangle.

Figure 34:
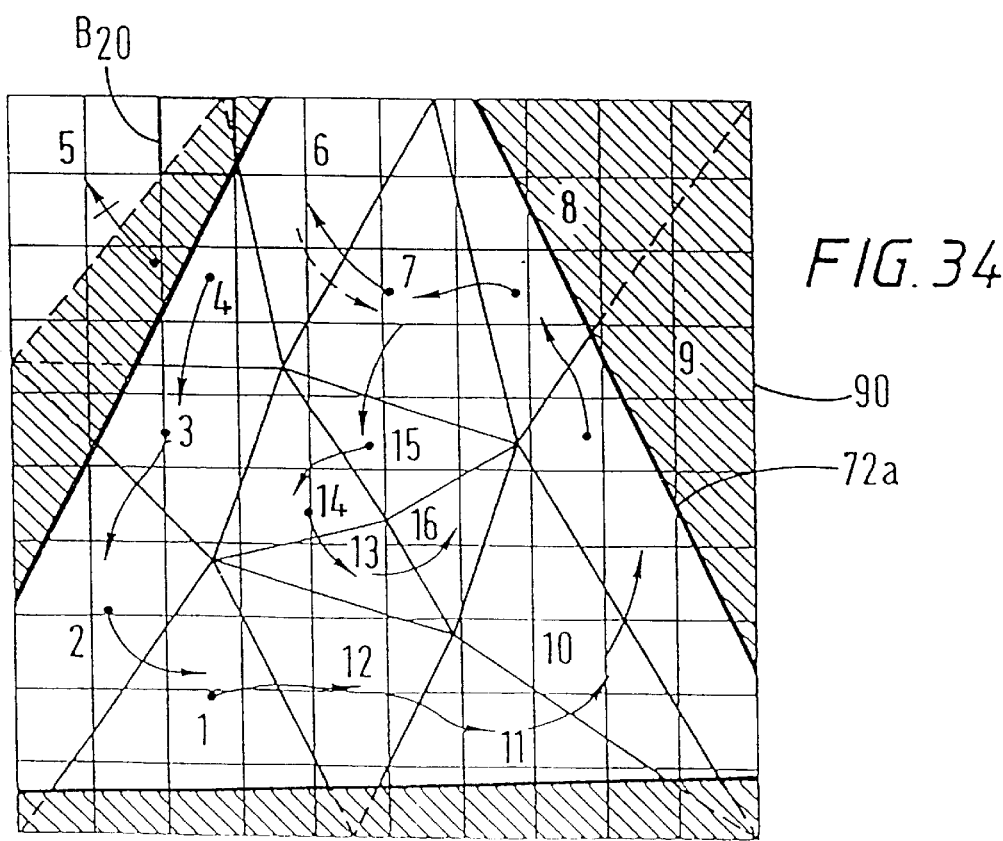
FIG. 34 is a diagram showing the application of the procedure illustrated in FIG. 18 to a block of the triangle illustrated in FIG. 33.

A third example will now be considered, in respect of repetition block 90 illustrated in FIG. 33 and in detail in FIG. 34.

With reference to that block 90, no corners of the block 90 lie within the object triangle. Moreover, no vertices of the object triangle lie within the block. Therefore, in step S5-24, the bins are scanned in turn until a first one is found which contains a triangle which overlaps the object triangle. That bin is identified as bin $B_{20}$, containing triangle $t_4$. $t_4$ is designated as STARTING TRIANGLE, and all three vertices of $t_4$ are considered in step S15-4; one of those vertices is found to lie within the object triangle. Therefore, $t_4$ is clipped and the clipped shape is dispatched to the rendering pipeline. Since one vertex alone lies inside the object triangle, the edge defined by the other two vertices is considered and is found to lie entirely outside the object triangle. Accordingly, the neighbour along that edge, namely triangle $t_5$, is clipped out in step S15-4. Then, triangles $t_4$, $t_3$, $t_2$, $t_1$, $t_{12}$, $t_{11}$, $t_{10}$, $t_9$, $t_8$, $t_7$ and $t_6$ are considered in the previously described fashion. However, once $t_6$ has been considered, it is found that its neighbours, namely triangles $t_4$ and $t_7$, have already been visited. Therefore, consideration is reverted to the previously considered triangle, namely triangle $t_7$. That triangle has a further neighbour which has neither been clipped out nor visited before, namely triangle $t_{15}$. Subsequently, triangles $t_{14}$, $t_{13}$ and $t_{16}$ are considered and dispatched to the rendering pipeline. Once $t_{16}$ has been considered, it is found that it also has no neighbours which have neither been clipped out nor visited before. However in this case, reversion to previously considered triangles takes consideration back to the first considered triangle (the STARTING TRIANGLE), namely triangle $t_4$, and so the procedure returns.

By the above described three examples, the procedure illustrated in FIG. 18 can be shown to deal with all circumstances which could be encountered by overlaying a square repetition block over a triangular object.

The above described geometric texture apparatus and method provides the viewer with a rendered image which includes not only texture bit maps over objects, but also real geometric texture to enhance the texture bit map.

Conveniently, the geometric texture could be mapped into the underlying object only when the object is viewed from a distance below a predetermined threshold. Above that threshold distance, it might be assumed that the level of detail required does not justify incorporating further polygons into the object to be rendered, and so the geometric texture can be omitted. In other words, as the viewpoint moves towards an object, the level of detail afforded to the object, is enhanced.

The example given above has been illustrated to show most clearly the facility of clipping individual triangles of a geometric texture to the underlying shape of an object triangle. In that respect, there has been no attempt to correlate the shape of the geometric texture to the underlying object, triangle. However, the present invention can also usefully be applied so that a geometric texture has shape and comprises polygons, which correlate with the underlying object, polygons or object shape to which the texture is to be applied in use.

In some circumstances, it can be convenient to represent an object, by means of a small number of large polygons, over which one or more textures are superimposed. In order to prevent parts of the polygons from being represented, the one or more textures can be provided with a mask. A texture mask is a map, usually of same resolution as the texture to which it is applied, the texture pixels (hereinafter referred to as "texels") thereof being either switched ON or OFF. A texel of the mask which is switched OFF prevents the corresponding texel in the texture from being used.

Figure 36:
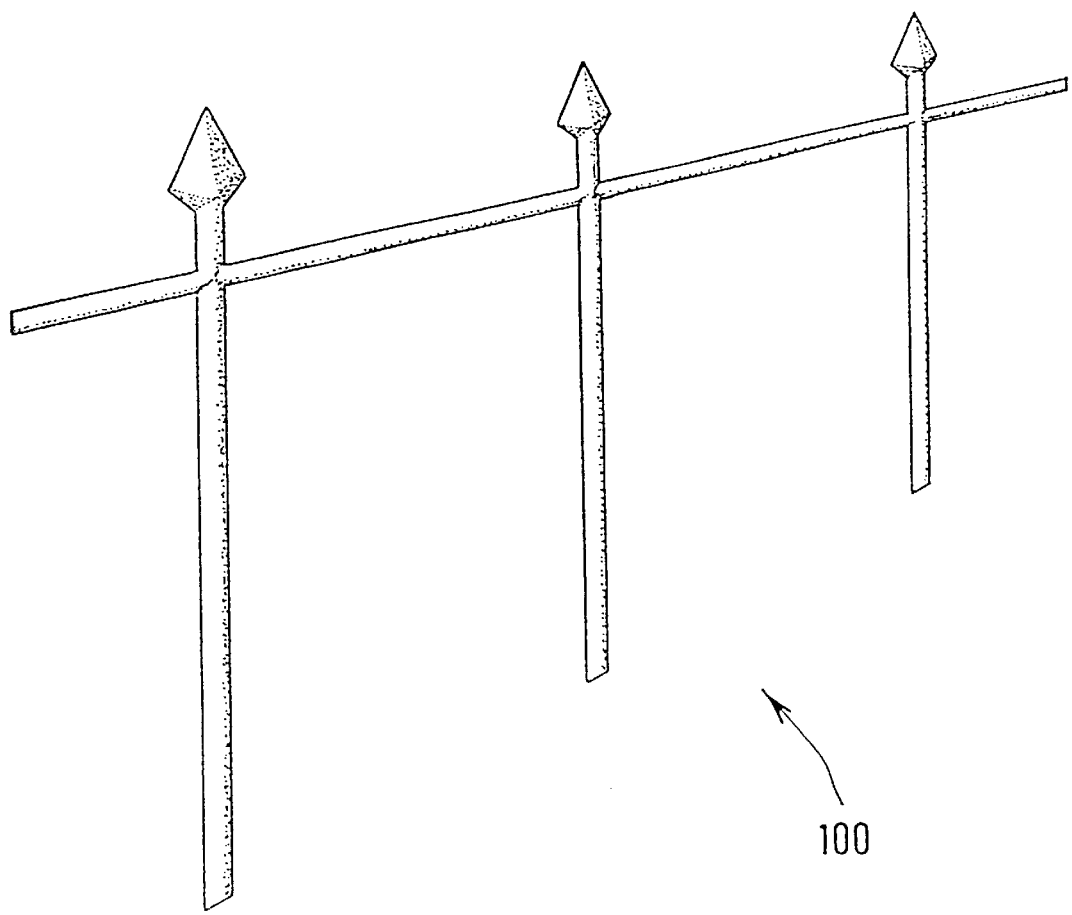
FIG. 36 is a perspective view of a three dimensional object to which a geometric texture is to be applied in accordance with a second specific embodiment.
Figure 37:
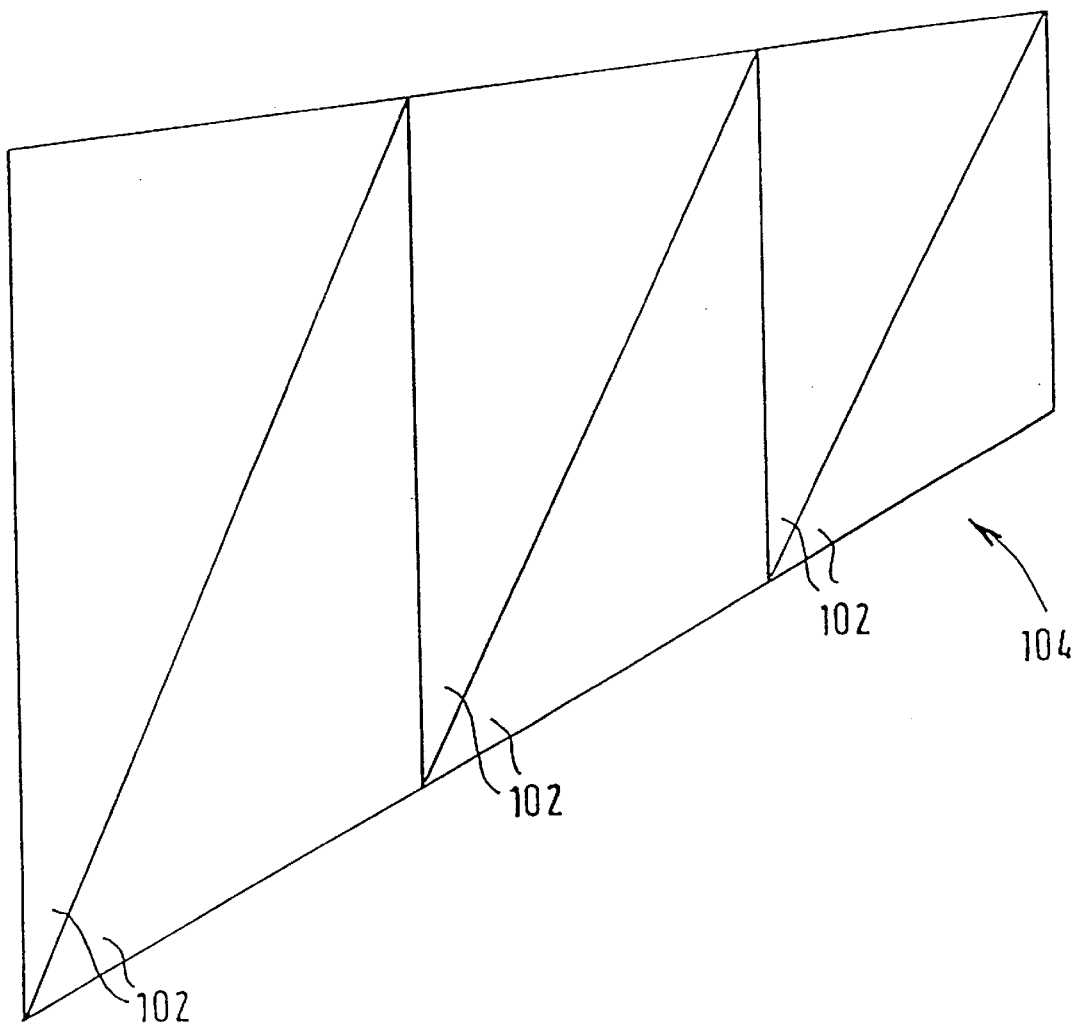
FIG. 37 is a perspective view of polygons defining the underlying structure of the object illustrated in FIG. 36.

FIG. 36 illustrates an example of an object, constructed in that manner. Subsequent drawings illustrate the underlying components which together define the overall appearance of the object. FIG. 37 shows adjacent triangles 102 which together define a surface 104 over which the portion of fencing 100 illustrated in FIG. 36 is to be represented.

Figure 38:
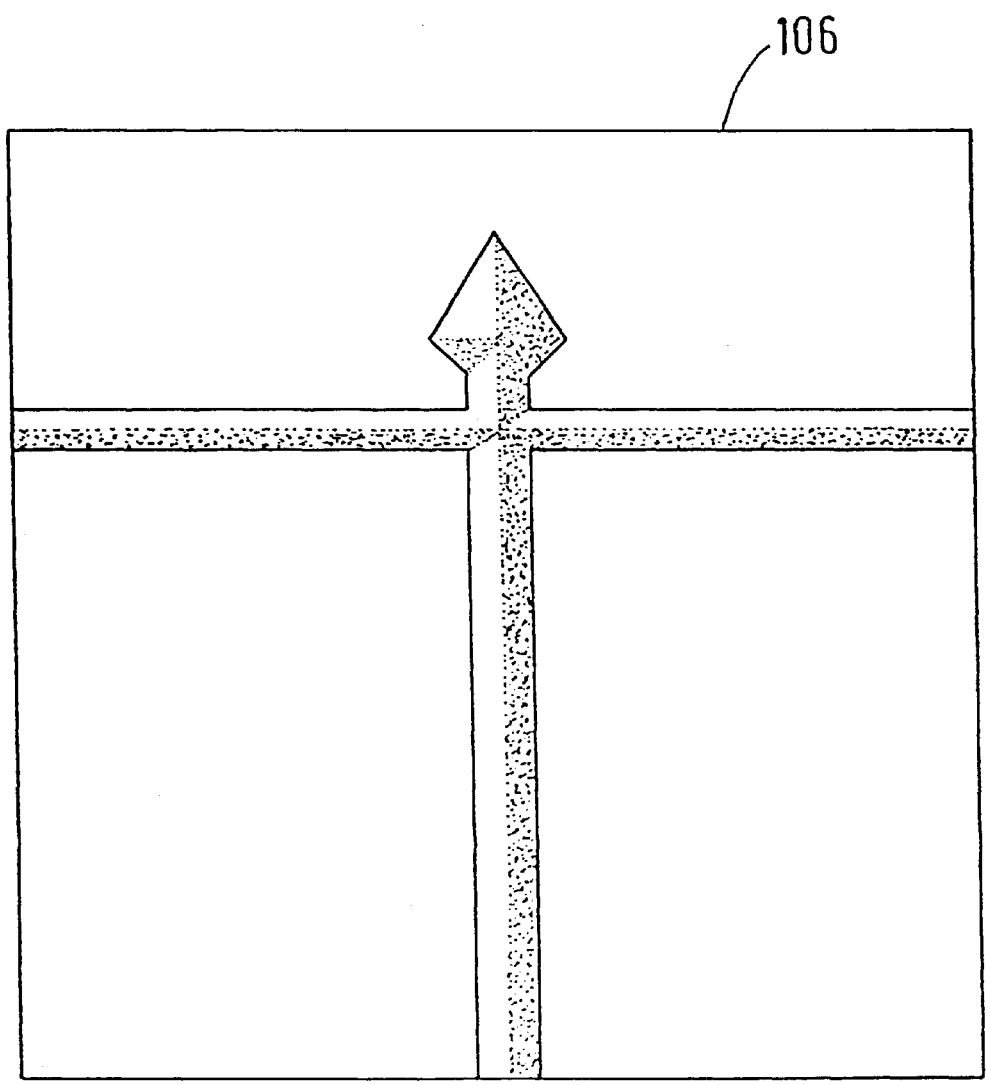
FIG. 38 illustrates a texture map to be tiled and to define the appearance of the object illustrated in FIG. 36.
Figure 39:
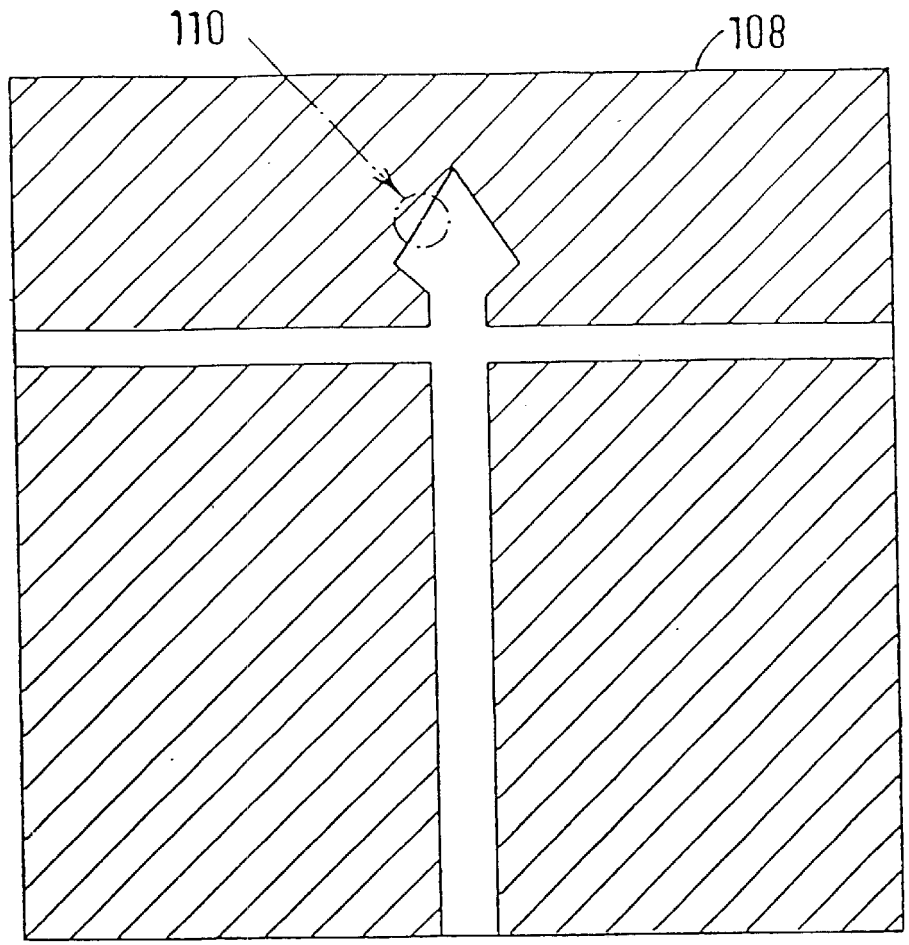
FIG. 39 illustrates a texture mask to be overlaid over the texture map illustrated in FIG. 38 in use.

The triangles 102 map in u,v space as previously described to a texture map as illustrated in FIG. 38. By means of skilled design of the texture map, the fence object, can be constructed of repetitions of the texture map, thereby reducing the amount of memory space required for storage of the overall object.

In order to ensure that the portions of the texture which are not part of the solid fencing portion 100 are not illustrated, a texture masking map 108 is applied to the texture map 106. The texture masking map 108 is of the same resolution as the texture map 106.

Figure 40:
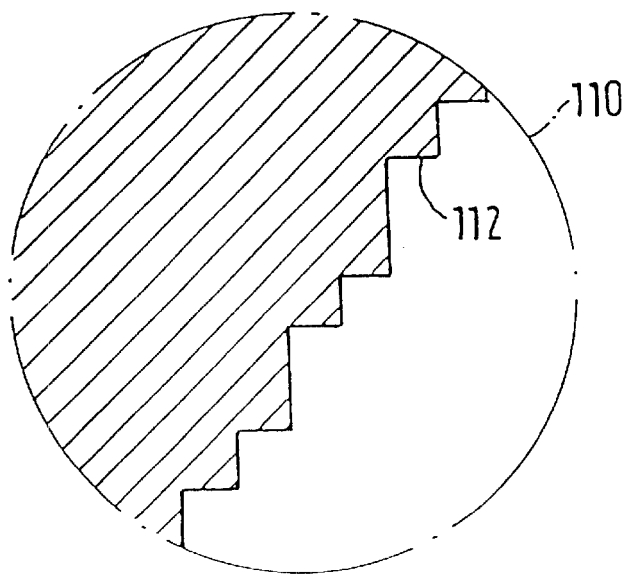
FIG. 40 illustrates in detail a portion of the texture mask illustrated in FIG. 39.

A portion 110 of the texture masking map 108 is illustrated in further detail in FIG. 40. This illustrates that the texel resolution of the texture map may not be sufficient₁ when viewing an object, close up, to prevent jagged edges 112 being illustrated to the viewer. This can be aesthetically undesirable.

Figure 41:
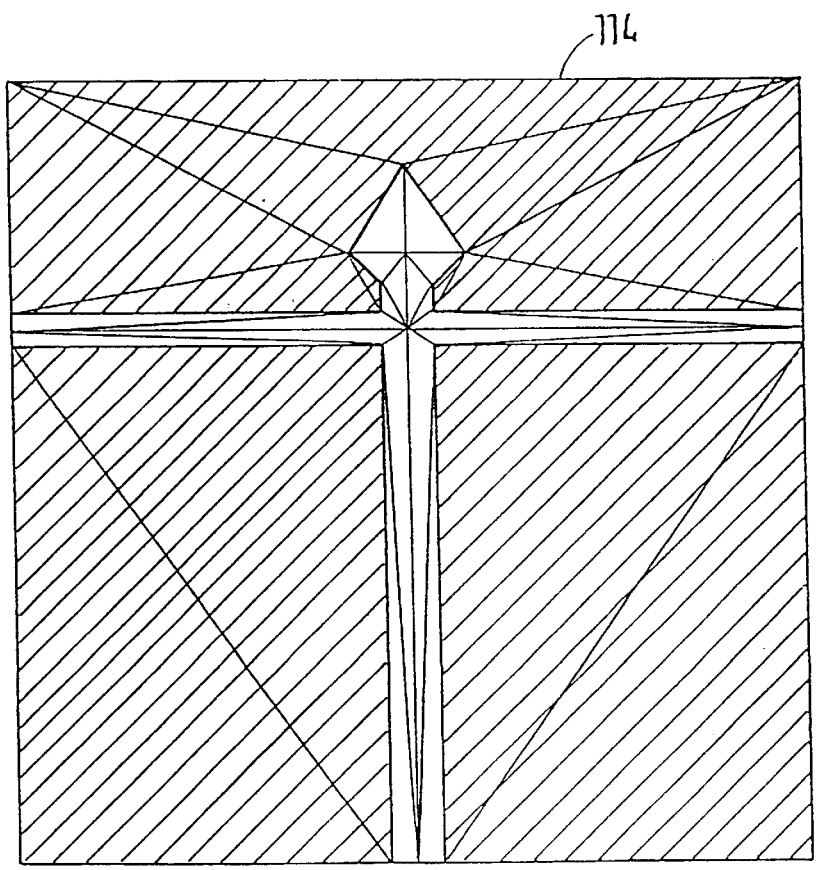
FIG. 41 is a plan view of a geometric texture to be applied to the object illustrated in FIG. 36.
Figure 42:
FIG. 42 is a side view of the geometric texture illustrated in FIG. 41.

As noted above, when the object, is at a depth from the viewer less than a level-of-detail threshold, a geometric texture is applied to the texture map 106. The geometric texture 114 to be applied to the texture map 106 is illustrated in FIG. 41 and FIG. 42.

Two potential problems which might arise with the use of the geometric texture with a mask texture are that the limited resolution of the texture mask might be visible, especially when the texture is viewed from a close distance, and may be clipped with the geometry of the geometric texture. Also, some geometry covered by a totally masked section of the texture will still be despatched to the rendering pipeline, which is inefficient.

Therefore, the geometric texture further comprises triangles capable of being flagged as "ON" or "OFF". A triangle flagged as "OFF" is then recognised by the apparatus as not required to be drawn. This feature is useful in the present case, because it means that a geometric texture can be designed, so that triangle to be drawn are positioned slightly from the edges of the texture mask, thereby eliminating the jagged edges 112 produced by the limited resolution of the texture mask 110. The shaded triangles in FIGS. 41 and 42 are applied as "OFF", and so are not drawn. These act as a further mask over the texture mask 110, removing the jagged edges 112.

The advantage of this arrangement is that triangles which are marked as "OFF" need not be despatched to the rendering pipeline. This makes the rendering of the geometrically enhanced object, more efficient.

The effect of geometric textures used in this way is to enhance the quality of image which can be presented to a viewer, in terms of the solidity of objects generated from relatively simple three dimensional primitives.

Figure 21:
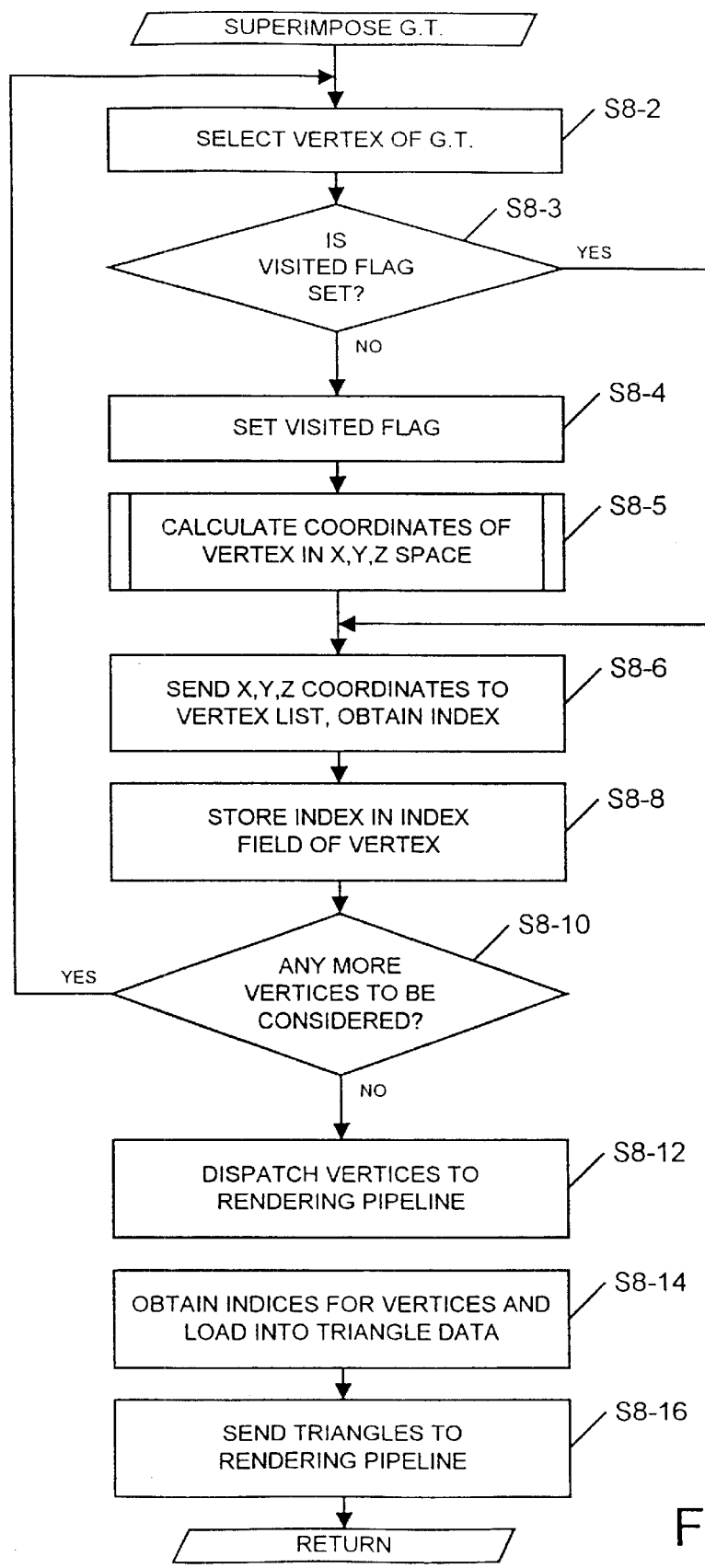
FIG. 21 is a flow diagram illustrating steps included in a SUPERIMPOSE GEOMETRIC TEXTURE sub-procedure of the sub-procedure illustrated in FIG. 18.
Figure 43:
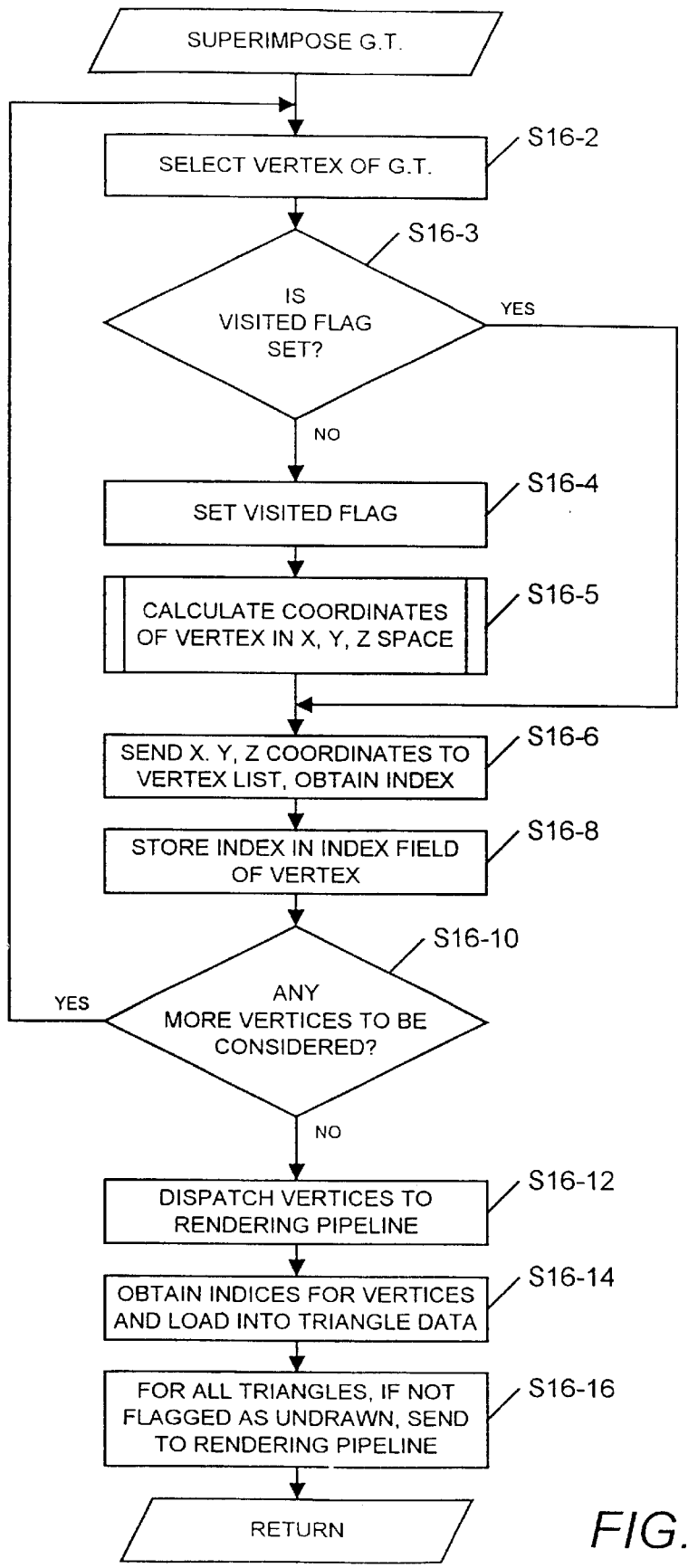
FIG. 43 is a flow diagram of a SUPERIMPOSE GEOMETRIC TEXTURE sub-procedure, in accordance with the second specific embodiment.
Figure 44:
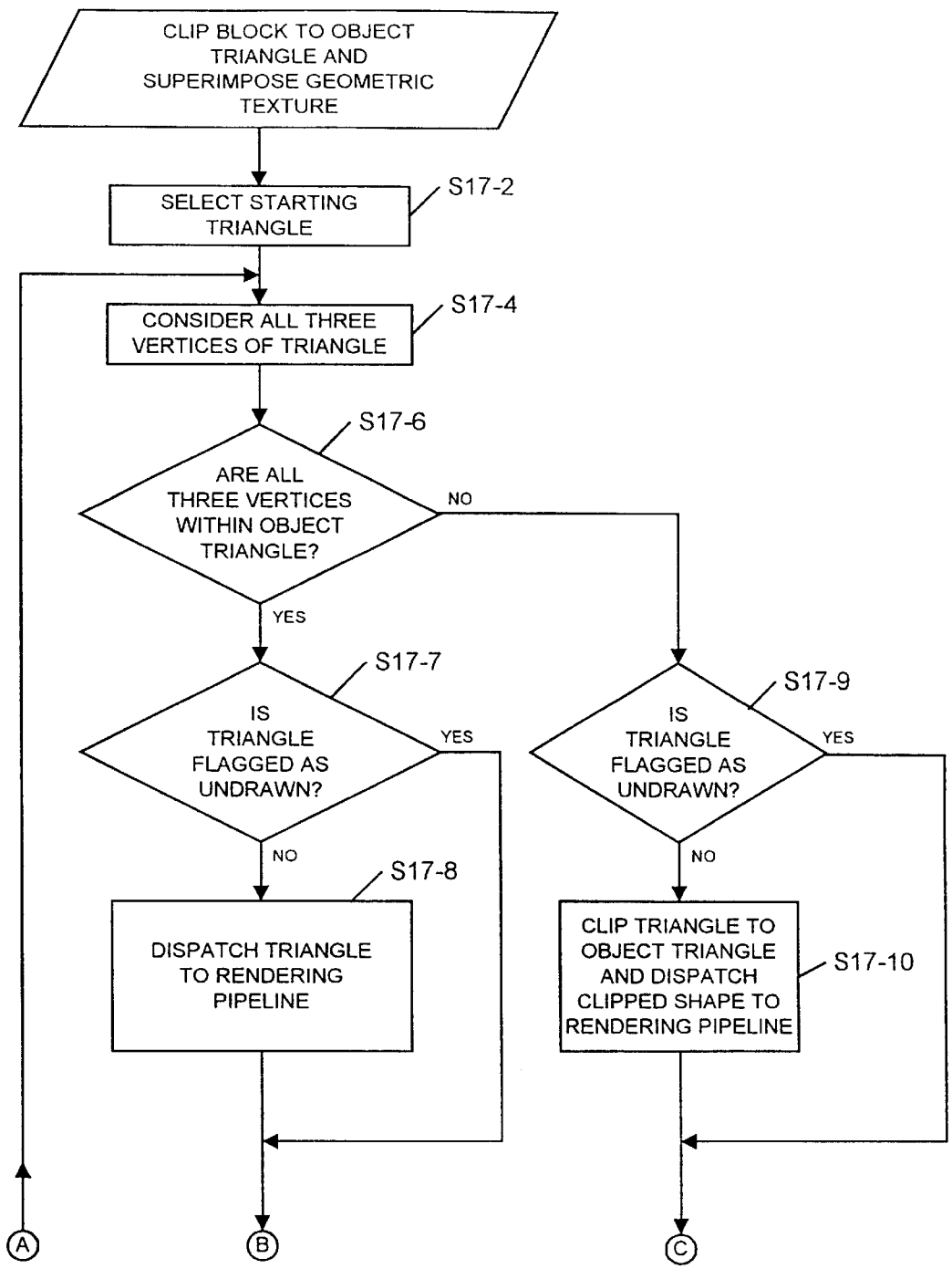
FIG. 44 is a flow diagram of a CLIP BLOCK TO OBJECT TRIANGLE AND SUPERIMPOSE GEOMETRIC TEXTURE sub-procedure, in accordance with the second specific embodiment.
Figure 44:
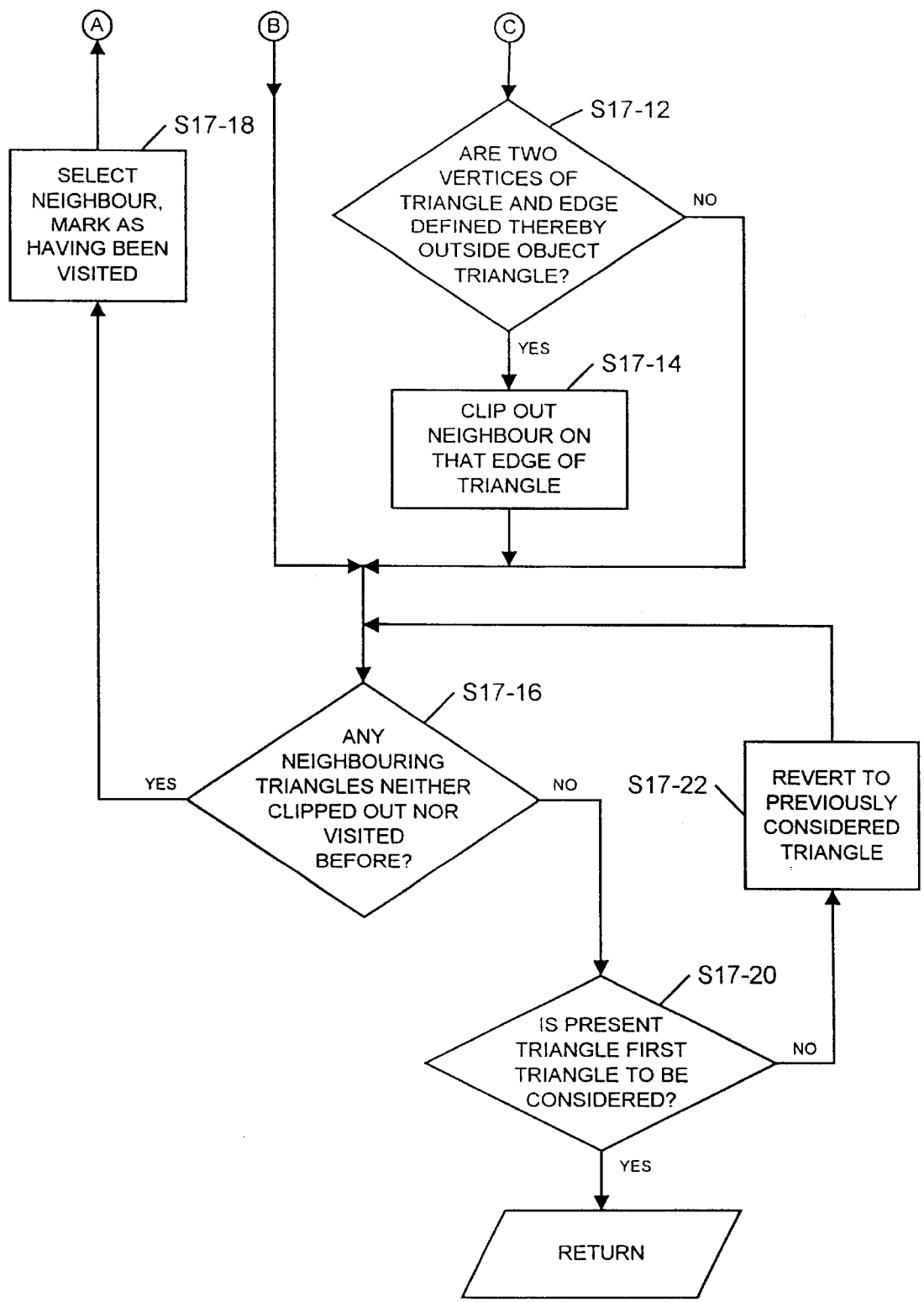

FIGS. 43 and 44 illustrate flowcharts which are, respectively, modified versions of FIGS. 21 and 28, taking account of the UNDRAWN/DRAWN flag associated with geometric texture triangles. As such, many of the steps are identical to those described previously with reference to FIGS. 21 and 28. However, in FIG. 43, step S16-16, as opposed to step S8-16 which dispatches all triangles to the rendering pipeline, includes a further check of the UNDRAWN/DRAWN flag for the triangle in question, and only dispatches a triangle if it is flagged to be DRAWN.

In FIG. 44, prior to dispatching a triangle to the rendering pipeline in step S17-8, or clipping and dispatching in step S17-10, a check is made in step S17-7 or step S17-9 respectively to establish whether the triangle in question is to be drawn. If it is, then the method combines with step S17-8 or step 17-10 as the case may be. If not, i.e. it is marked as UNDRAWN, the process bypasses the step S17-8, S17-10 dispatching the triangle, and proceeds with the next step S17-16 or S17-12 as the case may be.

The present invention, whether incorporating the use of masking by means of the ON/OFF flag herein described, provides a means by which an object, can be illustrated to different levels of detail of relief features, depending on the distance from which the object, in question is being viewed. In that way, high levels of visual realism can be achieved as required, without unnecessary rendering of features not visible from a longer distance.

Figure 45:
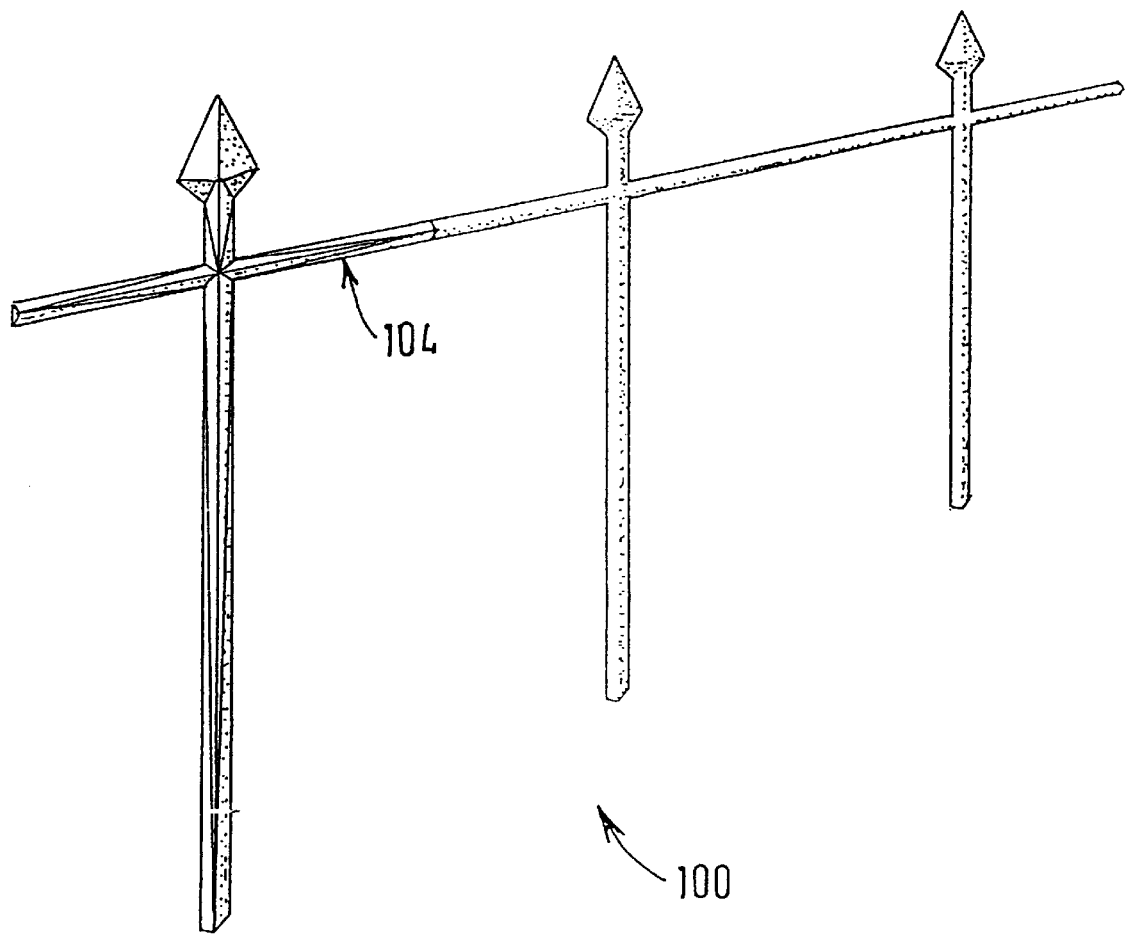
FIG. 45 is a perspective view of the object illustrated in FIG. 36 after superimposition of the geometric texture illustrated in FIGS. 41 and 42.

FIG. 45 illustrates the results of superimposing the geometric texture illustrated in FIGS. 41 and 42 over the object, 100 illustrated in FIG. 36. The computer has superimposed the geometric texture over the nearest pair of the triangles 102 of the object, as these are deemed to be close enough to justify adding additional geometry. Although FIG. 45 shows some underlying wire frame geometry to illustrate the solidity of the superimposed additional geometry, it can be seen that the addition of that geometry enhances the overall appearance of the object, and especially those portions of the object, which are sufficiently close to the position of the observer for deficiencies in relation to be noticed.

What is claimed is:

1. A computer graphics apparatus, comprising:
   at least one data store for storing 3D computer model data comprising data defining a plurality of planar polygons in three-dimensional space representing the surface shape of an object, and polygon modification data comprising data defining a plurality of planar polygons having vertices in a two-dimensional plane with a respective displacement value for each vertex defining a displacement for the vertex in a direction away from the plane; and a 3D computer model geometry modifier operable to process each of at least some of the polygons representing the surface shape of the object in the 3D computer model by:

mapping the polygon from the 3D computer model and polygons in the two-dimensional plane defined by the polygon modification data onto each other;

identifying which vertices of the polygons in the two-dimensional plane lie within the polygon from the 3D computer model as a result of the mapping; and modifying the polygon from the 3D computer model by subdividing the polygon into a plurality of smaller polygons using each identified vertex which lies within the polygon from the 3D computer model to define a respective vertex of a smaller polygon with a position displaced away from the plane of the polygon in the 3D computer model by a distance determined in dependence upon the displacement defined by the polygon modification data for the identified vertex.

2. The apparatus according to claim 1, wherein the 3D computer model geometry modifier is operable to define a vertex for a smaller polygon using an identified vertex which lies within the polygon from the 3D computer model by:

calculating a position in a three-dimensional space defining a position in the plane of the polygon from the 3D computer model for the vertex of the smaller polygon by interpolation between the positions in the three-dimensional space of the vertices of the polygon in the 3D computer model; and calculating a displaced position for the vertex of the smaller polygon away from the plane of the polygon in the 3D computer model in dependence upon the displacement defined by the polygon modification data for the corresponding identified vertex.

3. The apparatus according to claim 2, wherein the 3D computer model geometry modifier is operable to calculate a displaced position for the vertex of a smaller polygon by:

calculating a displacement direction by interpolation between the normal vector directions at the vertices of the polygon in the 3D computer model; and displacing the vertex for the smaller polygon away from the plane of the polygon in the 3D computer model in the calculated displacement direction by a distance defined by the polygon modification data for the corresponding identified vertex.

4. The apparatus according to claim 1, wherein the 3D computer model geometry modifier is operable to:

clip parts of the polygons in the two-dimensional plane defined by the polygon modification data which do not lie within the polygon from the 3D computer model as a result of the mapping; and subdivide the polygon from the 3D computer model into the smaller polygons in dependence upon the parts of the polygons in the two-dimensional plane remaining after the clipping.

5. The apparatus according to claim 4, wherein the 3D computer model geometry modifier is operable to subdivide the polygon from the 3D computer model by defining a vertex for a smaller polygon at each position at which an edge of a polygon in the two-dimensional plane intersects an edge of the polygon from the 3D computer model as a result of the projection.

6. The apparatus according to claim 1, wherein, the polygon modification data includes data for each planar polygon in the two-dimensional plane defining whether a smaller polygon generated therefrom in the 3D computer model is to be drawn when an image of the 3D computer model is generated; and the 3D computer model geometry modifier is operable to discard each smaller polygon not to be drawn in accordance with the polygon modification data.

7. The apparatus according to claim 1, wherein the polygon modification data defines the planar polygons to lie within a two-dimensional area corresponding to a two-dimensional area of a texture map comprising a bit map of texture data to be applied to smaller polygons generated from the planar polygons when an image of the 3D computer model is generated.

8. A storage medium storing data for use in an apparatus according to claim 1, the data comprising 3D computer model data comprising data defining a plurality of planar polygons in a three-dimensional space representing the surface shape of an object, and polygon modification data comprising data defining a plurality of planar polygons having vertices in a two-dimensional plane with a respective displacement value for each vertex defining a displacement for the vertex in a direction away from the plane.

9. A signal carrying data for use in an apparatus according to claim 1, the data comprising 3D computer model data comprising data defining a plurality of planar polygons in a three-dimensional space representing the surface shape of an object, and polygon modification data comprising data defining a plurality of planar polygons having vertices in a two-dimensional plane with a respective displacement value for each vertex defining a displacement for the vertex in a direction away from the plane.

10. A computer graphics apparatus, comprising:

a data receiver for receiving 3D computer model data comprising data defining the surface shape of an object in three-dimensional space, and polygon modification data comprising data defining a subsidiary three-dimensional structure comprising a plurality of planar polygons;

a 3D computer model geometry modifier operable to modify at least part of the surface shape of the object in the 3D computer model by:

mapping the part of the 3D computer model to be modified and the polygons in the subsidiary three-dimensional structure onto each other;

identifying which parts of the polygons in the subsidiary three-dimensional structure lie within the part of the 3D computer model to be modified as a result of the mapping; and modifying the part of the 3D computer model with polygons generated in dependence upon the identified parts of the polygons in the subsidiary three-dimensional structure which lie within the part of the 3D computer model.

11. A storage medium storing data for use in an apparatus according to claim 10, the data comprising 3D computer model data comprising data defining a plurality of planar polygons in a three-dimensional space representing the surface shape of an object, and polygon modification data comprising data defining a plurality of planar polygons having vertices in a two-dimensional plane with a respective displacement value for each vertex defining a displacement for the vertex in a direction away from the plane.

12. A signal carrying data for use in an apparatus according to claim 10, the data comprising 3D computer model data comprising data defining a plurality of planar polygons in a three-dimensional space representing the surface shape of an object, and polygon modification data comprising data defining a plurality of planar polygons having vertices in a two-dimensional plane with a respective displacement value for each vertex defining a displacement for the vertex in a direction away from the plane.

13. A method of processing 3D computer model data comprising data defining a plurality of planar polygons in three-dimensional space representing the surface shape of an object to modify the polygons representing the surface shape of the object, the method comprising processing each of at least some of the polygons representing the surface shape of the object in the 3D computer model by:

reading polygon modification data comprising data defining a plurality of planar polygons having vertices in a two-dimensional plane with a respective displacement value for each vertex defining a displacement for the vertex in a direction away from the plane;

mapping the polygon from the 3D computer model and polygons in the two-dimensional plane defined by the polygon modification data onto each other;

identifying which vertices of the polygons in the two-dimensional plane lie within the polygon from the 3D computer model as a result of the mapping; and modifying the polygon from the 3D computer model by subdividing the polygon into a plurality of smaller polygons using each identified vertex which lies within the polygon from the 3D computer model to define a respective vertex of a smaller polygon with a position displaced away from the plane of the polygon in the 3D computer model by a distance determined in dependence upon the displacement defined by the polygon modification data for the identified vertex.

14. The method according to claim 13, wherein the processing to define a vertex for a smaller polygon using an identified vertex which lies within the polygon from the 3D computer model comprises:

calculating a position in a three-dimensional space defining a position in the plane of the polygon from the 3D computer model for the vertex of the smaller polygon by interpolation between the positions in the three-dimensional space of the vertices of the polygon in the 3D computer model; and calculating a displaced position for the vertex of the smaller polygon away from the plane of the polygon in the 3D computer model in dependence upon the displacement defined by the polygon modification data for the corresponding identified vertex.

15. The method according to claim 14, wherein the processing to calculate a displaced position for the vertex of a smaller polygon comprises:

calculating a displacement direction by interpolation between the normal vector directions at the vertices of the polygon in the 3D computer model; and displacing the vertex for the smaller polygon away from the plane of the polygon in the 3D computer model in the calculated displacement direction by a distance defined by the polygon modification data for the corresponding identified vertex.

16. The method according to claim 13, wherein the processing of at least one polygon in the 3D computer model comprises:

clipping parts of the polygons in the two-dimensional plane defined by the polygon modification data which do not lie within the polygon from the 3D computer model as a result of the mapping; and subdividing the polygon from the 3D computer model into the smaller polygons in dependence upon the parts of the polygons in the two-dimensional plane remaining after the clipping.

17. The method according to claim 16, wherein the processing to subdivide the polygon from the 3D computer model comprises defining a vertex for a smaller polygon at each position at which an edge of a polygon in the two-dimensional plane intersects an edge of the polygon from the 3D computer model as a result of the projection.

18. The method according to claim 13, wherein, the polygon modification data includes data for each planar polygon in the two-dimensional plane defining whether a smaller polygon generated therefrom in the 3D computer model is to be drawn when an image of the 3D computer model is generated; and each smaller polygon defined by the polygon modification data as a polygon not to be drawn is discarded.

19. The method according to claim 13, wherein the polygon modification data defines the planar polygons to lie within a two-dimensional area corresponding to a two-dimensional area of a texture map comprising a bit map of texture data to be applied to smaller polygons generated from the planar polygons when an image of the 3D computer model is generated.

20. A method of processing 3D computer model data comprising data defining the surface shape of an object in three-dimensional space to modify at least part of the surface shape of the object in the 3D computer model by:

reading polygon modification data comprising data defining a subsidiary three-dimensional structure comprising a plurality of planar polygons;

mapping the part of the 3D computer model to be modified and the polygons in the subsidiary three-dimensional structure onto each other;

identifying which parts of the polygons in the subsidiary three-dimensional structure lie within the part of the 3D computer model to be modified as a result of the mapping; and modifying the part of the 3D computer model with polygons generated in dependence upon the identified parts of the polygons in the subsidiary three-dimensional structure which lie within the part of the 3D computer model.

21. A storage medium storing instructions for programming a programmable processing apparatus to become operable to process 3D computer model data comprising data defining a plurality of planar polygons in three-dimensional space representing the surface shape of an object, and polygon modification data comprising data defining a plurality of planar polygons having vertices in a two-dimensional plane with a respective displacement value for each vertex defining a displacement for the vertex in a direction away from the plane, to modify the polygons representing the surface shape of the object, the instructions comprising instructions for programming the programmable processing apparatus to become operable to process each of at least some of the polygons representing the surface shape of the object in the 3D computer model by:

mapping the polygon from the 3D computer model and polygons in the two-dimensional plane defined by the polygon modification data onto each other;

identifying which vertices of the polygons in the two-dimensional plane lie within the polygon from the 3D computer model as a result of the mapping; and modifying the polygon from the 3D computer model by subdividing the polygon into a plurality of smaller polygons using each identified vertex which lies within the polygon from the 3D computer model to define a respective vertex of a smaller polygon with a position displaced away from the plane of the polygon in the 3D computer model by a distance determined in dependence upon the displacement defined by the polygon modification data for the identified vertex.

22. The storage medium according to claim 21, wherein the instructions comprise instructions to program the programmable processing apparatus to become operable to define a vertex for a smaller polygon using an identified vertex which lies within the polygon from the 3D computer model by:

calculating a position in three-dimensional space defining a position in the plane of the polygon from the 3D computer model for the vertex of the smaller polygon by interpolation between the positions in the three-dimensional space of the vertices of the polygon in the 3D computer model; and calculating a displaced position for the vertex of the smaller polygon away from the plane of the polygon in the 3D computer model in dependence upon the displacement defined by the polygon modification data for the corresponding identified vertex.

23. The storage medium according to claim 22, wherein the instructions comprise instructions to program the programmable processing apparatus to become operable to calculate a displaced position for the vertex of a smaller polygon by:

calculating a displacement direction by interpolation between the normal vector directions at the vertices of the polygon in the 3D computer model; and displacing the vertex for the smaller polygon away from the plane of the polygon in the 3D computer model in the calculated displacement direction by a distance defined by the polygon modification data for the corresponding identified vertex.

24. The storage medium according to claim 21, wherein the instructions comprise instructions to program the programmable processing apparatus to become operable to:

clip parts of the polygons in the two-dimensional plane defined by the polygon modification data which do not lie within the polygon from the 3D computer model as a result of the mapping; and subdivide the polygon from the 3D computer model into the smaller polygons in dependence upon the parts of the polygons in the two-dimensional plane remaining after the clipping.

25. A storage medium according to claim 24, wherein the instructions comprise instructions to program the programmable processing apparatus to become operable to subdivide the polygon from the 3D computer model by defining a vertex for a smaller polygon at each position at which an edge of a polygon in the two-dimensional plane intersects an edge of the polygon from the 3D computer model as a result of the projection.

26. The storage medium according to claim 21, wherein:

the polygon modification data includes data for each planar polygon in the two-dimensional plane defining whether a smaller polygon generated therefrom in the 3D computer model is to be drawn when an image of the 3D computer model is generated; and the instructions comprise instructions to program the programmable processing apparatus to become operable to discard each smaller polygon not to be drawn in accordance with the polygon modification data.

27. A storage medium storing instructions for programming a programmable processing apparatus to become operable to process 3D computer model data comprising data defining the surface shape of an object in three-dimensional space, and polygon modification data comprising data defining a subsidiary three-dimensional structure comprising a plurality of planar polygons, the instructions comprising instructions for programming the programmable processing apparatus to become operable to modify at least part of the surface shape of the object in the 3D computer model by:

mapping the part of the 3D computer model to be modified and the polygons in the subsidiary three-dimensional structure onto each other;

identifying which parts of the polygons in the subsidiary three-dimensional structure lie within the part of the 3D computer model to be modified as a result of the mapping; and modifying the part of the 3D computer model with polygons generated in dependence upon the identified parts of the polygons in the subsidiary three-dimensional structure which lie within the part of the 3D computer model.

28. A signal carrying instructions for programming a programmable processing apparatus to become operable to process 3D computer model data comprising data defining a plurality of planar polygons in three-dimensional space representing the surface shape of an object, and polygon modification data comprising data defining a plurality of planar polygons having vertices in a two-dimensional plane with a respective displacement value for each vertex defining a displacement for the vertex in a direction away from the plane, to modify the polygons representing the surface shape of the object, the instructions comprising instructions for programming the programmable processing apparatus to become operable to process each of at least some of the polygons representing the surface shape of the object in the 3D computer model by:

mapping the polygon from the 3D computer model and polygons in the two-dimensional plane defined by the polygon modification data onto each other;

identifying which vertices of the polygons in the two-dimensional plane lie within the polygon from the 3D computer model as a result of the mapping; and modifying the polygon from the 3D computer model by subdividing the polygon into a plurality of smaller polygons using each identified vertex which lies within the polygon from the 3D computer model to define a respective vertex of a smaller polygon with a position displaced away from the plane of the polygon in the 3D computer model by a distance determined in dependence upon the displacement defined by the polygon modification data for the identified vertex.

29. A signal according to claim 28, wherein the instructions comprise instructions to program the programmable processing apparatus to become operable to define a vertex for a smaller polygon using an identified vertex which lies within the polygon from the 3D computer model by:

calculating a position in three-dimensional space defining a position in the plane of the polygon from the 3D computer model for the vertex of the smaller polygon by interpolation between the positions in the three-dimensional space of the vertices of the polygon in the 3D computer model; and calculating a displaced position for the vertex of the smaller polygon away from the plane of the polygon in the 3D computer model in dependence upon the displacement defined by the polygon modification data for the corresponding identified vertex.

30. The signal according to claim 29, wherein the instructions comprise instructions to program the programmable processing apparatus to become operable to calculate a displaced position for the vertex of a smaller polygon by:

calculating a displacement direction by interpolation between the normal vector directions at the vertices of the polygon in the 3D computer model; and displacing the vertex for the smaller polygon away from the plane of the polygon in the 3D computer model in the calculated displacement direction by a distance defined by the polygon modification data for the corresponding identified vertex.

31. The signal according to claim 28, wherein the instructions comprise instructions to program the programmable processing apparatus to become operable to:

clip parts of the polygons in the two-dimensional plane defined by the polygon modification data which do not lie within the polygon from the 3D computer model as a result of the mapping; and subdivide the polygon from the 3D computer model into the smaller polygons in dependence upon the parts of the polygons in the two-dimensional plane remaining after the clipping.

32. The signal according to claim 31, wherein the instructions comprise instructions to program the programmable processing apparatus to become operable to subdivide the polygon from the 3D computer model by defining a vertex for a smaller polygon at each position at which an edge of a polygon in the two-dimensional plane intersects an edge of the polygon from the 3D computer model as a result of the projection.

33. The signal according to claim 28, wherein, the polygon modification data includes data for each planar polygon in the two-dimensional plane defining whether a smaller polygon generated therefrom in the 3D computer model is to be drawn when an image of the 3D computer model is generated; and the instructions comprise instructions to program the programmable processing apparatus to become operable to discard each smaller polygon not to be drawn in accordance with the polygon modification data.

34. A signal carrying instructions for programming a programmable processing apparatus to become operable to process 3D computer model data comprising data defining the surface shape of an object in three-dimensional space, and polygon modification data comprising data defining a subsidiary three-dimensional structure comprising a plurality of planar polygons, the instructions comprising instructions for programming the programmable processing apparatus to become operable to modify at least part of the surface shape of the object in the 3D computer model by:

mapping the part of the 3D computer model to be modified and the polygons in the subsidiary three-dimensional structure onto each other;

identifying which parts of the polygons in the subsidiary three-dimensional structure lie within the part of the 3D computer model to be modified as a result of the mapping; and modifying the part of the 3D computer model with polygons generated in dependence upon the identified parts of the polygons in the subsidiary three-dimensional structure which lie within the part of the 3D computer model.

* * * * *

UNITED STATES PATENT AND TRADEMARK OFFICE
CERTIFICATE OF CORRECTION

PATENT NO. : 6,714,195 B1
DATED : March 30, 2004
INVENTOR(S) : Rabin Ezra et al.

It is certified that error appears in the above-identified patent and that said Letters Patent is hereby corrected as shown below:

Title page,
Item [56], References Cited, OTHER PUBLICATIONS, "Miyata" reference, "No. 6" should read -- No. 6, --; and
"Rabinovich" reference, "Rabinovich et al" should read -- Rabinovich et al., --.

Column 1,
Line 3, "with" should read -- with an --.

Column 2,
Line 5, "Robert L Cook" should read -- Robert L. Cook --;
Line 6, "Volume 18" should read -- Volume 18, --; "pp 223-231)" should read -- pp. 223-231) --; and
Line 51, "to-which" should read -- to which --.

Column 4,
Line 22, "relative" should read -- relative to --.

Column 6,
Line 65, "page" should read -- pages --.

Column 10,
Line 8, "flag-is" should read -- flag is --.

Column 11,
Line 54, "The block" should read -- the block --; and
Line 67, "The" should read -- the --.

Column 12,
Line 39, "value" should read -- value, --.

Column 13,
Line 38, "TRIANGLE" should read -- TRIANGLE? --;

Column 14,
Line 27, "S9-2-the" should read -- S9-2 the --.

Column 15,
Lines 36 and 62, "onwards." should read -- onward. --.

UNITED STATES PATENT AND TRADEMARK OFFICE
CERTIFICATE OF CORRECTION

PATENT NO. : 6,714,195 B1
DATED : March 30, 2004
INVENTOR(S) : Rabin Ezra et al.

It is certified that error appears in the above-identified patent and that said Letters Patent is hereby corrected as shown below:

Column 16,
Line 37, "onwards." should read -- onward. --.

Column 17,
Line 58, "triangle ti" should read -- triangle $t_1$ --.

Column 18,
Line 3, "bin $B_5$," should read -- bin $B_{51}$ --;
Line 23, "emphasised" should read -- emphasized --; and
Line 44, "$t_4 1$" should read -- $t_4$, --.

Column 19,
Lines 15, 21, 30 and 53, "object," should read -- object --;
Line 49, "$sufficient_1$" should read -- sufficient, --;
Line 64, "despatched" should read -- dispatched --.

Column 20,
Line 1, "recognised" should read -- recognized --;
Line 4, "triangle" should read -- triangles --;
Line 11, "despatched" should read -- dispatched --;
Lines 13, 39, 41, 46 and 55, "object," should read -- object --;

Signed and Sealed this

Fifth Day of July, 2005

JON W. DUDAS
*Director of the United States Patent and Trademark Office*